US008107672B2

(12) United States Patent
Goto

(10) Patent No.: US 8,107,672 B2
(45) Date of Patent: Jan. 31, 2012

(54) MAKEUP SIMULATION SYSTEM, MAKEUP SIMULATOR, MAKEUP SIMULATION METHOD, AND MAKEUP SIMULATION PROGRAM

(75) Inventor: Yasuo Goto, Tokyo (JP)

(73) Assignee: Shiseido Company, Ltd., Tokyo (JP)

( * ) Notice: Subject to any disclaimer, the term of this patent is extended or adjusted under 35 U.S.C. 154(b) by 838 days.

(21) Appl. No.: 12/160,322

(22) PCT Filed: Jan. 15, 2007

(86) PCT No.: PCT/JP2007/050429
§ 371 (c)(1),
(2), (4) Date: Aug. 15, 2008

(87) PCT Pub. No.: WO2007/083600
PCT Pub. Date: Jul. 26, 2007

(65) Prior Publication Data
US 2010/0226531 A1   Sep. 9, 2010

(30) Foreign Application Priority Data
Jan. 17, 2006   (JP) .................................. 2006-009268

(51) Int. Cl.
*G06K 9/00* (2006.01)
(52) U.S. Cl. ........................................................ 382/100
(58) Field of Classification Search .................. 382/100, 382/128, 284; 348/77, 121; 705/26.61, 26.62, 705/26.63, 26.64
See application file for complete search history.

(56) References Cited

U.S. PATENT DOCUMENTS

| 4,539,585 | A * | 9/1985 | Spackova et al. ............... 358/93 |
| 2002/0071604 | A1 * | 6/2002 | Orpaz et al. ................... 382/162 |
| 2002/0090123 | A1 | 7/2002 | Bazin ............................. 382/128 |
| 2003/0063794 | A1 * | 4/2003 | Rubinstenn et al. .......... 382/154 |
| 2003/0120534 | A1 | 6/2003 | Giacchetti et al. ............... 705/10 |
| 2004/0078278 | A1 | 4/2004 | Dauga et al. ..................... 705/26 |

FOREIGN PATENT DOCUMENTS

| EP | 1 030 267 A1 | 8/2000 |
| EP | 1 134 701 A2 | 9/2001 |
| FR | 2 810 761 A1 | 12/2001 |
| JP | 2001-346627 A | 12/2001 |
| JP | 2002-304620 A | 10/2002 |
| JP | 2003-044837 A | 2/2003 |
| JP | 2004-094917 A | 3/2004 |
| JP | 2004-234571 A | 8/2004 |

OTHER PUBLICATIONS

Machine translation of JP 2004-94917 A.*
Machine translation of JP 2004-234571 A.*
Extended European Search Report mailed Apr. 29, 2011.

* cited by examiner

*Primary Examiner* — Andrew W Johns
(74) *Attorney, Agent, or Firm* — IPUSA, PLLC

(57) ABSTRACT

According to the present invention, a makeup simulation system applying makeup to a video having an image of the face of a user captured thereon is characterized by image capturing means for capturing the image of the face of the user and outputting the video, control means for receiving the video output from the image capturing means, performing image processing on the video, and outputting the video; and display means for displaying the video output from the control means, wherein the control means includes face recognition means for recognizing the face of the user from the video based on predetermined tracking points; and makeup processing means for applying a predetermined makeup on the face of the user included in the video based on the tracking points and outputting the video to the display means.

15 Claims, 31 Drawing Sheets

FIG.19

| | | |
|---|---|---|
| EYES | OMBRE COULEUR 106 | GRADE REALITE COLOR B ALONG ROUNDNESS OF EYE FROM UPPER EYE EDGE (ER4) TO CENTER OF EYELID (HALFWAY BETWEEN ER 5 AND ER4). ALSO GRADED OVER ENTIRE EDGE OF LOWER EYELASHES. |
| | | GRADE REALITE COLOR C OUTSIDE B GRADED AT END OF UPPER EYELID (FROM CENTER OF ER4 AND ER5 TO PASS THROUGH AROUND 2/3 POINT BETWEEN BR1 AND ER1). |
| | | GRADE REALITE COLOR A OVER ENTIRE EDGE OF UPPER EYELASHES (ER4-ER1) AND LOWER 1/3 PORTION FROM OUTER CORNER OF EYE (ER2-ER1) THINLY AND SLIGHTLY LONG AND NARROWLY. |
| | COUTURIER COLOR | FOR FURTHER BRIGHTNESS, GRADE COUTURIER COLOR ON CENTER OF UPPER EYELID (ON ER5), UNDER OUTER EYEBROW END (FROM BR4 TO BR1), AND ON INNER CORNER OF EYE (CENTERING ON ER4 AND DOWNWARD) IN SUCH MANNER TO PLACE POWDER. |
| | MASCARA BRILLIANT BR | APPLY TO EYELASHES FROM ROOT TO TIP IN COMBING MANNER, MOVING LITTLE BY LITTLE IN ZIGZAG MANNER FROM UPPER AND LOWER CENTERS OF EYE (ER5, ER3) TO OUTER CORNER OF EYE (ER1) TO INNER CORNER OF EYE (ER4) IN THIS ORDER, AND FINALLY APPLY OVER EYELASHES OF OUTER CORNER OF EYE (ER6-ER1) TO GIVE FINISH OF LONG AND NARROW IMAGE. |
| MOUTH | ROUGE A LEVRES RD2 | APPLY FROM MOUTH CORNER (M5) TO CENTER (M4-M3) IN SUCH MANNER TO FIT WITH OUTLINE. DRAW STRAIGHT AT MOUTH CORNER PART (M5) AND ROUNDLY AT PEAK PART (M4). |
| CHEEKS | BLUSH COULEUR (BEIGE) | GRADE IN CIRCLE ALONG CHEEKBONE (AROUND 2/3 BETWEEN F7 AND F9) OUTWARD FROM CENTER OF CHEEK (AROUND HALFWAY FROM ER3 RIGHT DOWN TO LINE CONNECTING N3 AND F9) |
| | BRIGHT LIGHT COLOR | APPLY AROUND CHEEK COLOR SO THAT IT BLENDS WITH CHEEK COLOR. |

WITHOUT GRADING     WITH GRADING

TRACKING POINTS TO REFER TO

TRACKING POINTS TO REFER TO

TRACKING POINTS
TO REFER TO

ORIGINAL IMAGE      AFTER GRADING

MAKEUP SIMULATION SYSTEM, MAKEUP SIMULATOR, MAKEUP SIMULATION METHOD, AND MAKEUP SIMULATION PROGRAM

TECHNICAL FIELD

The present invention relates to makeup simulation systems, makeup simulators, makeup simulation methods, and makeup simulation programs, and more particularly to a makeup simulation system, a makeup simulator, a makeup simulation method, and a makeup simulation program for applying makeup on a user's face included in a video.

BACKGROUND ART

A conventional technique is known that simulates a face with makeup on a computer without actually applying makeup in order to sell commercial products for applying makeup. (See, for example, Patent Document 1.) However, according to Patent Document 1, a simulation result is displayed in a still image, which has made it difficult to check the made-up face reflecting a change in the user's expression. Therefore, the development of a technology that simulates makeup in a video having a change in a user's expression captured thereon has been advanced. (See, for Example, Patent Document 2.)

However, the makeup simulator described in Patent Document 2 calculates a makeup region to which to apply a face makeup by specifying a change in the user's expression by pixel regions corresponding to the mouth and eyes and tracking the pixel regions with template matching. (See, for example, paragraph [0028].) Tracking a change in the user's expression with the pixel regions corresponding to the mouth and eyes as described above imposes a large processing load on a computer, and thus has the problem of difficulty in accurately responding to cases such as eye closing.

[Patent Document 1] Japanese Laid-Open Patent Application No. 2001-346627
[Patent Document 2] Japanese Laid-Open Patent Application No. 2003-44837

DISCLOSURE OF THE INVENTION

Problems to be Solved by the Invention

The present invention has been made in view of the above-described points, and has an object of providing a makeup simulation system, a makeup simulator, a makeup simulation method, and a makeup simulation program that make it possible to accurately make up a user's face included in a video with a reduced processing load.

Means for Solving the Problems

According to the present invention, in order to solve the above-described problems, a makeup simulation system applying makeup to a video having an image of the face of a user captured thereon is characterized by image capturing means for capturing the image of the face of the user and outputting the video, control means for receiving the video output from the image capturing means, performing image processing on the video, and outputting the video; and display means for displaying the video output from the control means, wherein the control means includes face recognition means for recognizing the face of the user from the video based on predetermined tracking points; and makeup processing means for applying a predetermined makeup on the face of the user included in the video based on the tracking points and outputting the video to the display means.

According to the present invention, by having face recognition means for recognizing the face of a user from a video based on predetermined tracking points and makeup processing means for applying a predetermined makeup on the face of the user included in the video based on the tracking points and outputting the video to display means, it is possible to recognize the face of the user from the video based on the tracking points with a reduced processing load and to apply makeup with accuracy to the face of the user included in the video based on the tracking points.

Methods, apparatuses, systems, computer programs, recording media, and data structures to which elements, representations, or any combination of elements of the present invention is applied are also effective as modes of the present invention.

EFFECTS OF THE INVENTION

According to the present invention, it is possible to provide a makeup simulation system, a makeup simulator, a makeup simulation method, and a makeup simulation program that make it possible to accurately make up a user's face included in a video with a reduced processing load.

BRIEF DESCRIPTION OF THE DRAWINGS

FIG. 19 is a configuration diagram of a makeup processing parameter file.

DESCRIPTION OF REFERENCE NUMERALS

Figure 1:
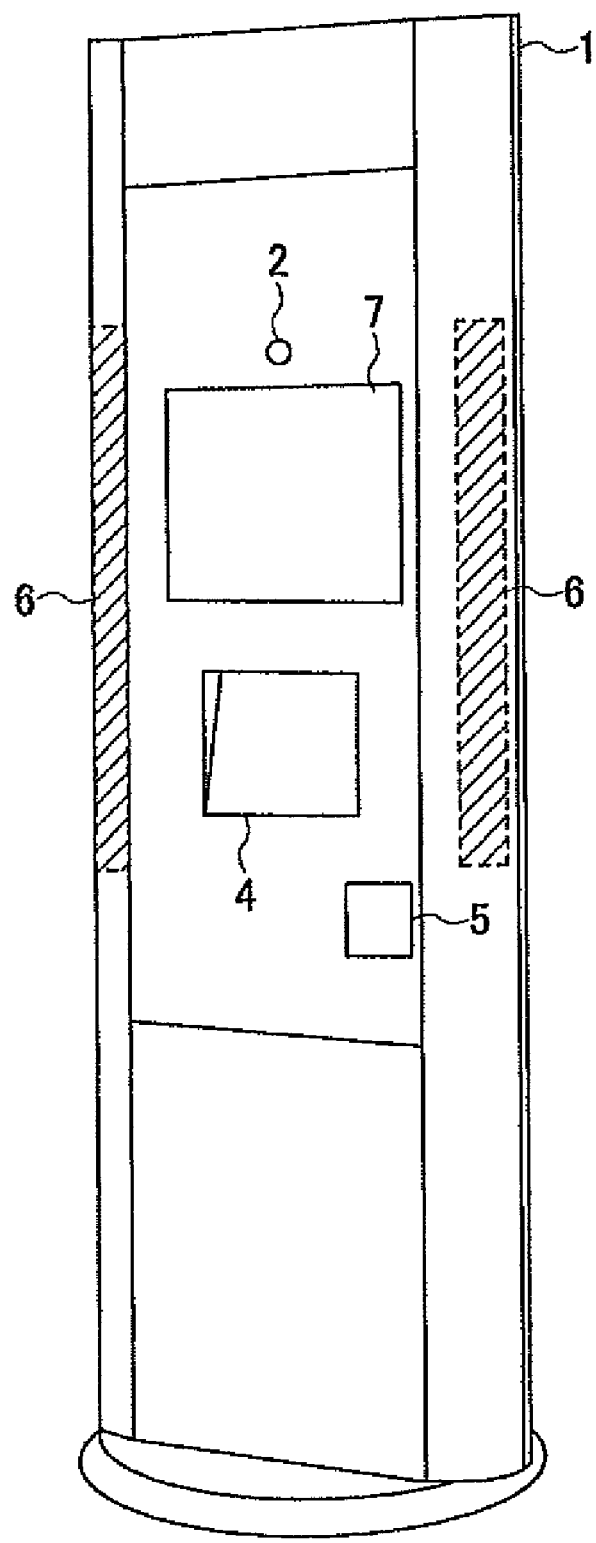
FIG. 1 is an external view of a first embodiment of a makeup simulator according to the present invention.

1 Makeup simulator
2 Camera
3 Half mirror
4 Operations panel
5 Printer
6 Light
7 Monitor
8 Control part
9 Transparent plate
10 Processor
11 Memory unit
12 Drive unit
13 Secondary storage unit
14 Recording medium
15 Touch panel monitor
16 Display case
17 IC tag reader/writer
25 Still image system
27 Shared memory
28 Simulator main application
29 Interface application
33 Face recognition part
34 Tracking points
35 Makeup processing part
36 Foundation processing part
37 Eyebrow processing part
38 Shadow processing part
39 Lipstick processing part
40 Cheek processing part
41 Merchandise information

BEST MODES FOR CARRYING OUT THE INVENTION

Next, a description is given, based on the following embodiments with reference to the drawings, of the best modes for carrying out the present invention. FIG. 1 is an external view of a first embodiment of a makeup simulator according to the present invention. The makeup simulator 1 includes a camera 2, an operations panel 4, a printer 5, lights 6, and a monitor 7.

The camera 2 captures an image of a user standing in front of the makeup simulator 1 and outputs a video. The operations panel 4 displays an operation image and outputs operation information in response to reception of an operation from a user. The printer 5 prints an image (such as an imaginary image with makeup) and information (such as merchandise information for doing makeup like the imaginary image) displayed on the monitor. The lights 6 control light after the start of a makeup simulation, for example.

Figure 2:
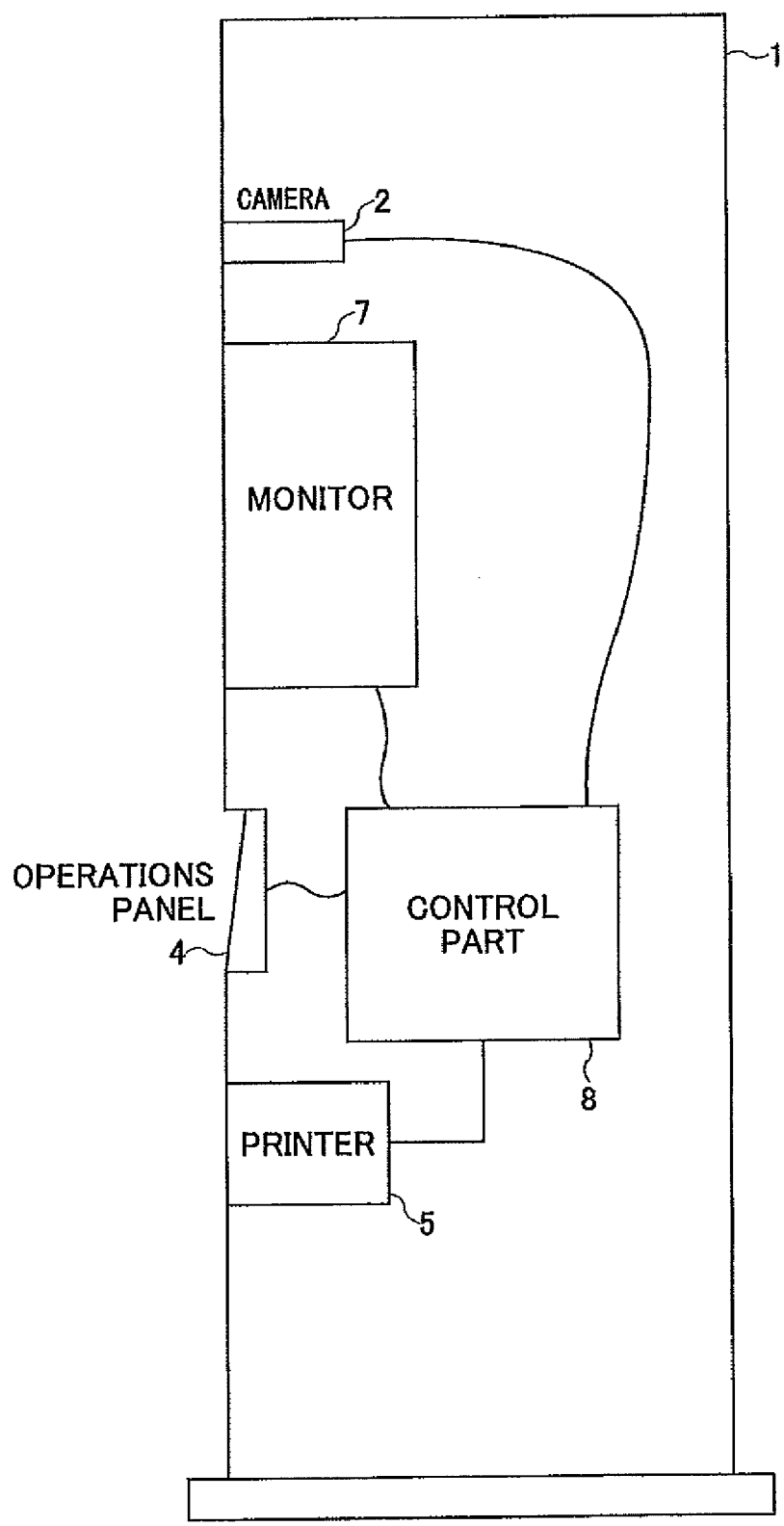
FIG. 2 is a cross-sectional view of the first embodiment of the makeup simulator.

FIG. 2 is a cross-sectional view of the first embodiment of the makeup simulator. The makeup simulator 1 includes the camera 2, the operations panel 4, the printer 5, the monitor 7, and a control part 8.

The camera 2 outputs a captured video to the control part 8. The operations panel 4 displays an operation image output from the control part 8, and outputs operation information to the control part 8 in response to reception of an operation from a user. The printer 5 prints an image and information output from the control 8. The monitor 7 displays a video (main image) output from the control part 8. The control part 8 receives a video output from the camera 2, applies makeup on a user's face included in the video by performing image processing on the video as described below, and outputs the video to the monitor 7.

The makeup simulator 1 of FIG. 1 and FIG. 2, which is based on a mirror, an item indispensable for makeup, as a concept, has the function of interacting with a user. That is, the makeup simulator 1 has the characteristic of giving a user a natural feeling as if the user were putting on makeup, looking at a mirror.

The makeup simulator 1 performs image processing on a video output from the camera 2 in the control part 8, thereby applying makeup on a user's face included in the image, and displays the video on the monitor 7, which is a digital mirror. The makeup simulator 1 is capable of displaying various merchandise and cosmetic information items and the imaginary image of a user's face with makeup applied on it on the monitor 7.

Figure 3:
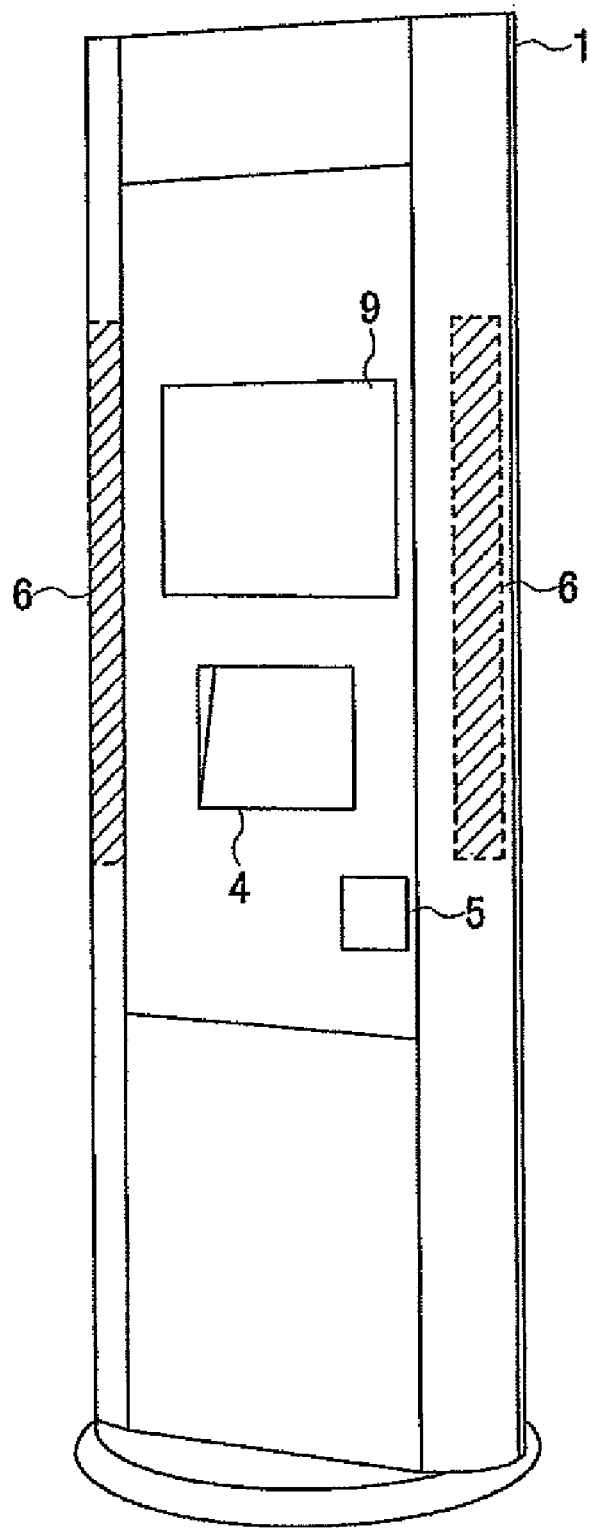
FIG. 3 is an external view of a second embodiment of the makeup simulator according to the present invention.

Further, FIG. 3 is an external view of a second embodiment of the makeup simulator according to the present invention. The same parts as those of FIG. 1 are assigned the same reference numerals.

The makeup simulator 1 of FIG. 3 includes the operations panel 4, the printer 5, the lights 6, and a transparent plate 9.

The transparent plate 9 transmits light from outside the makeup simulator 1 and transmits light from inside the makeup simulator 1.

Figure 4:
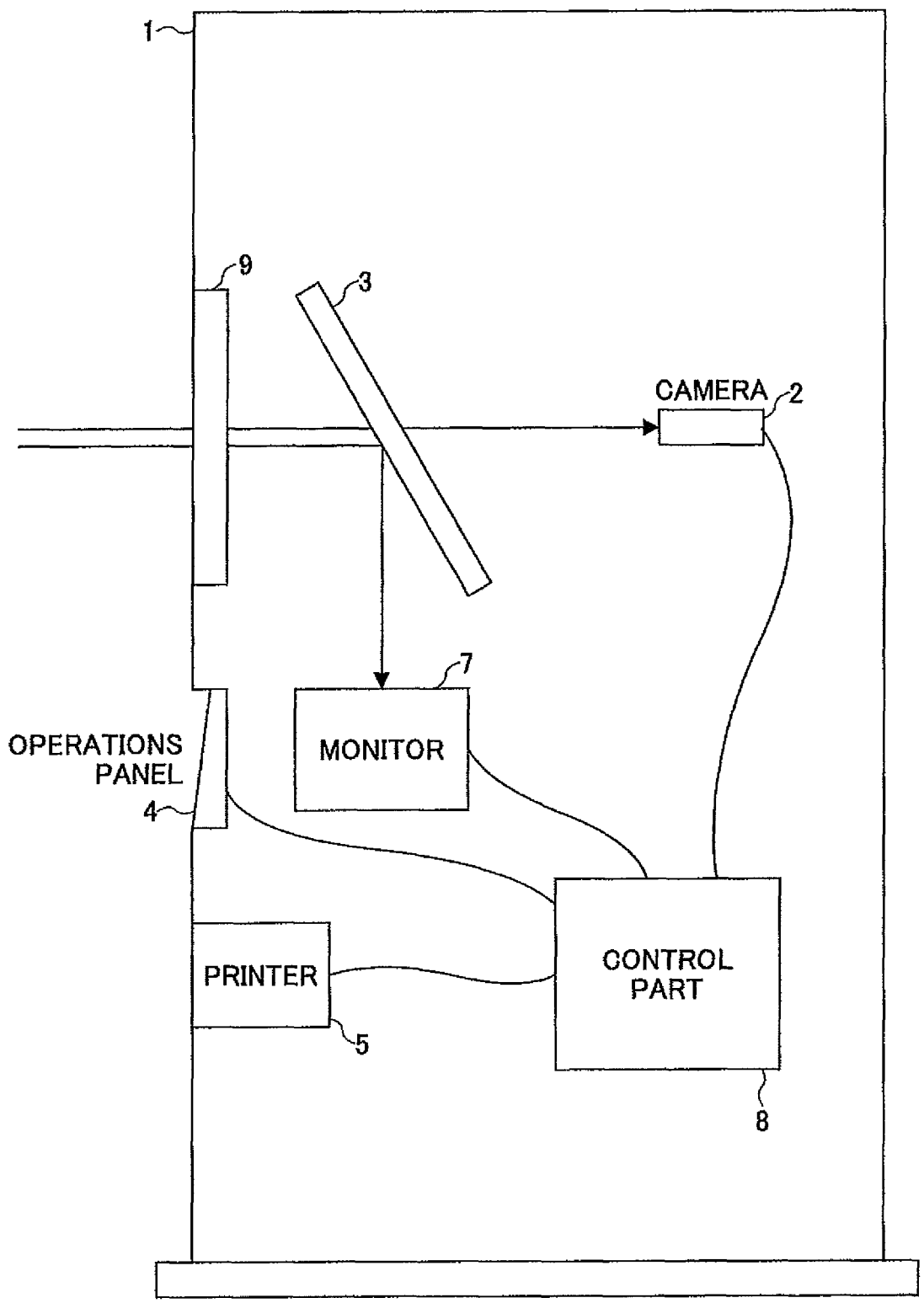
FIG. 4 is a cross-sectional view of the second embodiment of the makeup simulator.

FIG. 4 is a cross-sectional view of the second embodiment of the makeup simulator. The same parts as those of FIG. 2 are assigned the same reference numerals. The makeup simulator 1 of FIG. 4 includes the camera 2, a half mirror 3, the operations panel 4, the printer 5, the monitor 7, the control part 8, and the transparent plate 9.

The half mirror (semi-transparent mirror) 3 reflects light striking it and allows part of the striking light through it. The camera 2 is provided at a position where the camera 2 can capture an image of a user standing in front of the makeup simulator 1 through the half mirror 3 and the transparent plate 9. The camera 2 is provided at the level of the user's eyes. The camera 2 captures an image of the user standing in front of the makeup simulator 1 through the half mirror 3 and the transparent plate 9, and outputs a video.

The monitor 7 is provided at such a position as to enable a user standing in front of the makeup simulator 1 to view the monitor 7 through the half mirror 3 and the transparent plate 9. The output light of the monitor 7 is reflected by the half mirror 3 to be output outside the makeup simulator 1 through the transparent plate 9. Accordingly, the user can view a video displayed on the monitor 7 from outside the makeup simulator 1.

The makeup simulator 1 of FIG. 3 and FIG. 4, which is based on a mirror, an item indispensable for makeup, as a concept, has the function of interacting with a user. That is, the makeup simulator 1 has the characteristic of giving a user a natural feeling as if the user were putting on makeup, looking at a mirror.

Since the makeup simulator 1 has the camera 2 provided at the level of a user's eyes, the image of the face of a user standing in front of the makeup simulator 1 can be captured more naturally than by providing the camera 2 at its position in the first embodiment.

The makeup simulator 1 performs image processing on a video output from the camera 2 in the control part 8, thereby applying makeup on a user's face included in the image, and displays the video on the monitor 7, which is a digital mirror. The makeup simulator 1 is capable of displaying various merchandise and cosmetic information items and the imaginary image of a user's face with makeup applied on it on the monitor 7.

Figure 5:
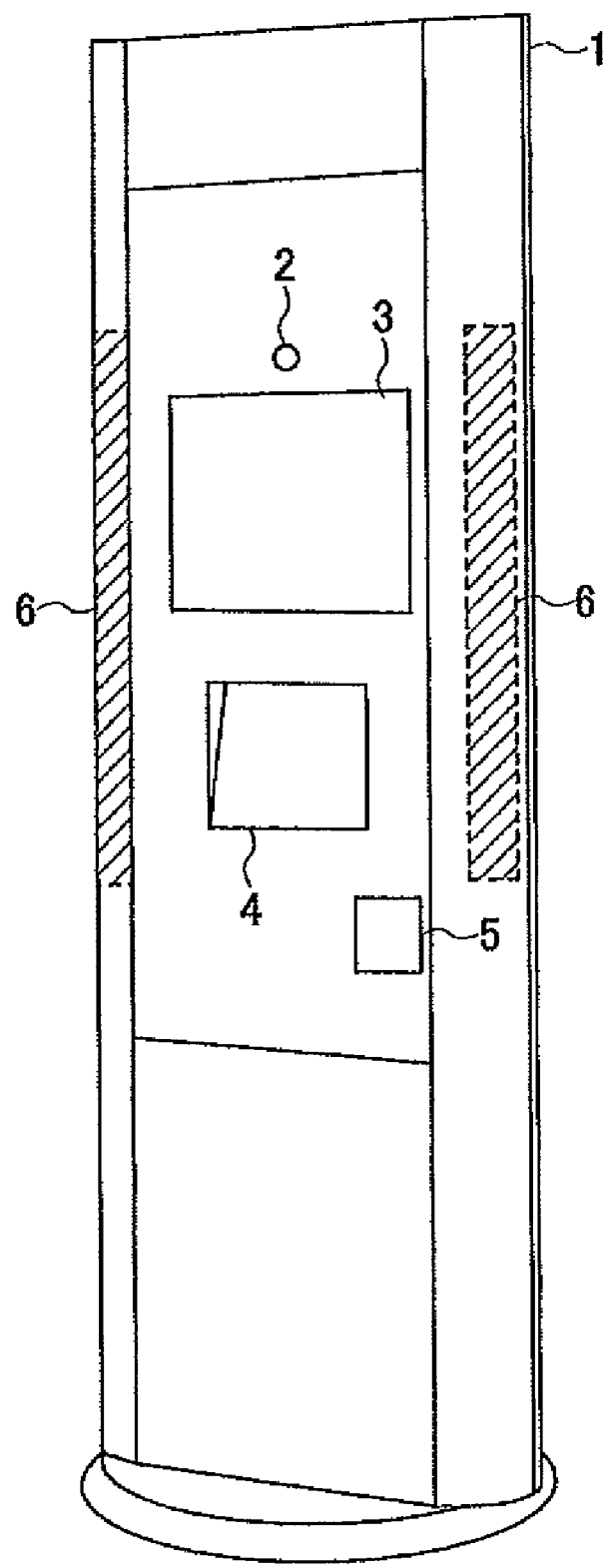
FIG. 5 is an external view of a third embodiment of the makeup simulator according to the present invention.

Further, FIG. 5 is an external view of a third embodiment of the makeup simulator according to the present invention. The same parts as those of the previous drawings are assigned the same reference numerals. The makeup simulator 1 of FIG. 5 includes the camera 2, the half mirror 3, the operations panel 4, the printer 5, and the lights 6.

The half mirror 3 transmits part (for example, 50%) of light from the bright side and reflects the rest (for example, 50%) of the light from the bright side to the front side. Since there is no light on the dark side, the half mirror 3 neither transmits nor reflects light from the dark side.

The lights 6 control light after the start of a makeup simulation so as to brighten the monitor 7 side of the half mirror 3. Accordingly, the half mirror 3 provided on the display direction side of the monitor 7 reflects light from the user side (outside the makeup simulator 1) to function as a mirror before the start of the makeup simulation.

After the start of the makeup simulation, the half mirror 3 functions as glass to transmit light from the monitor 7 side (inside the makeup simulator 1). Accordingly, a user can view a video displayed on the monitor 7 through the half mirror 3.

Figure 6:
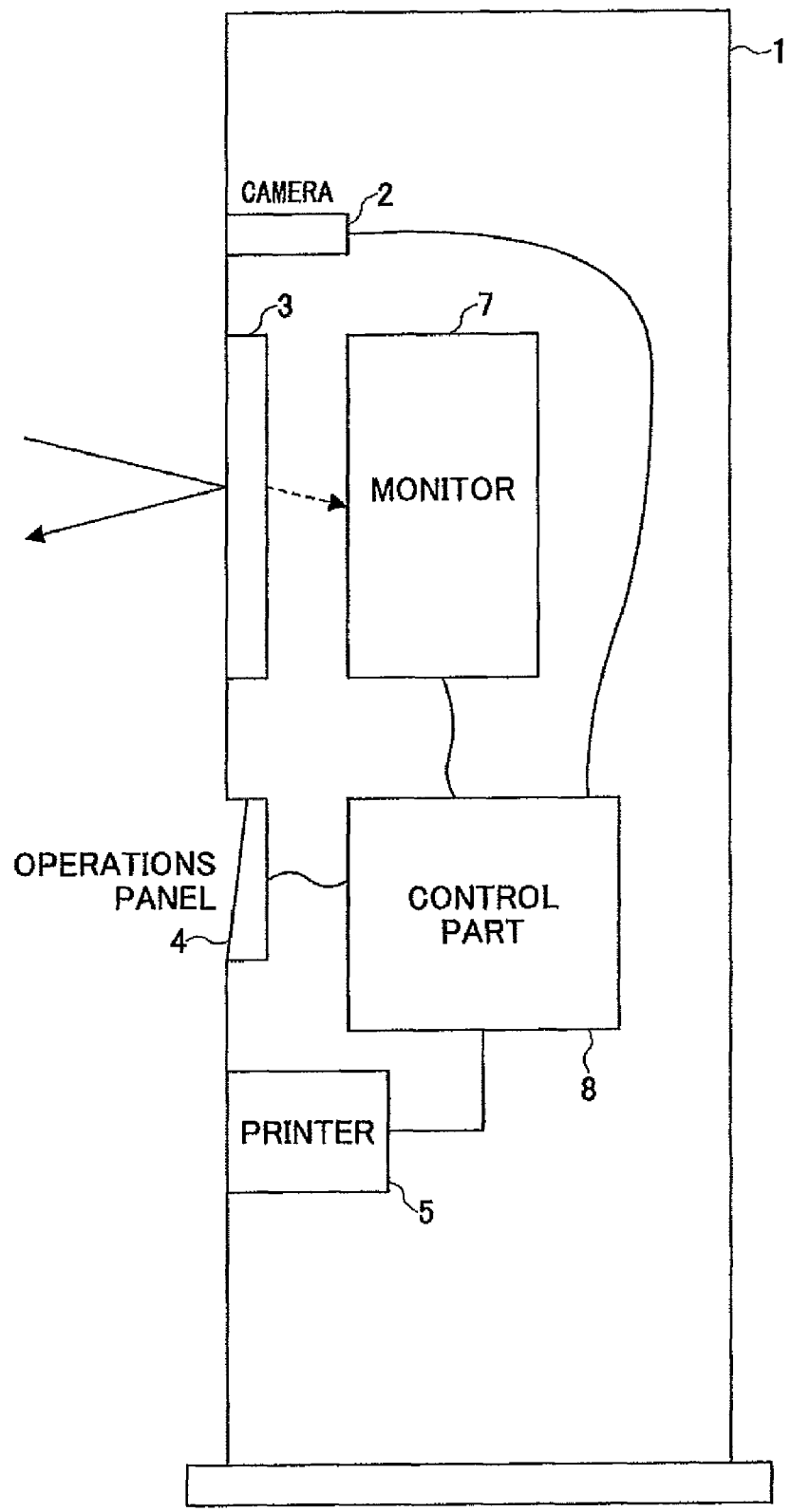
FIG. 6 is a cross-sectional view of the third embodiment of the makeup simulator.

FIG. 6 is a cross-sectional view of the third embodiment of the makeup simulator. The makeup simulator 1 of FIG. 6 includes the camera 2, the half mirror 3, the operations panel 4, the printer 5, the monitor 7, and the control part 8. The same parts as those of the previous drawings are assigned the same reference numerals. A video displayed on the monitor 7 passes through the half mirror 3 functioning as glass. A user can view the video displayed on the monitor 7 from outside the makeup simulator 1.

The makeup simulator 1 of FIG. 5 and FIG. 6, which is based on a mirror, an item indispensable for makeup, as a concept, has the function of interacting with a user. That is, the makeup simulator 1 has the characteristic of giving a user a natural feeling as if the user were putting on makeup, looking at a mirror.

The makeup simulator 1 performs image processing on a video output from the camera 2 in the control part 8, thereby applying makeup on a user's face included in the image, and displays the video on the monitor 7, which is a digital mirror. The makeup simulator 1 is capable of displaying various merchandise and cosmetic information items and the imaginary image of a user's face with makeup applied on it on the monitor 7.

Figure 7:
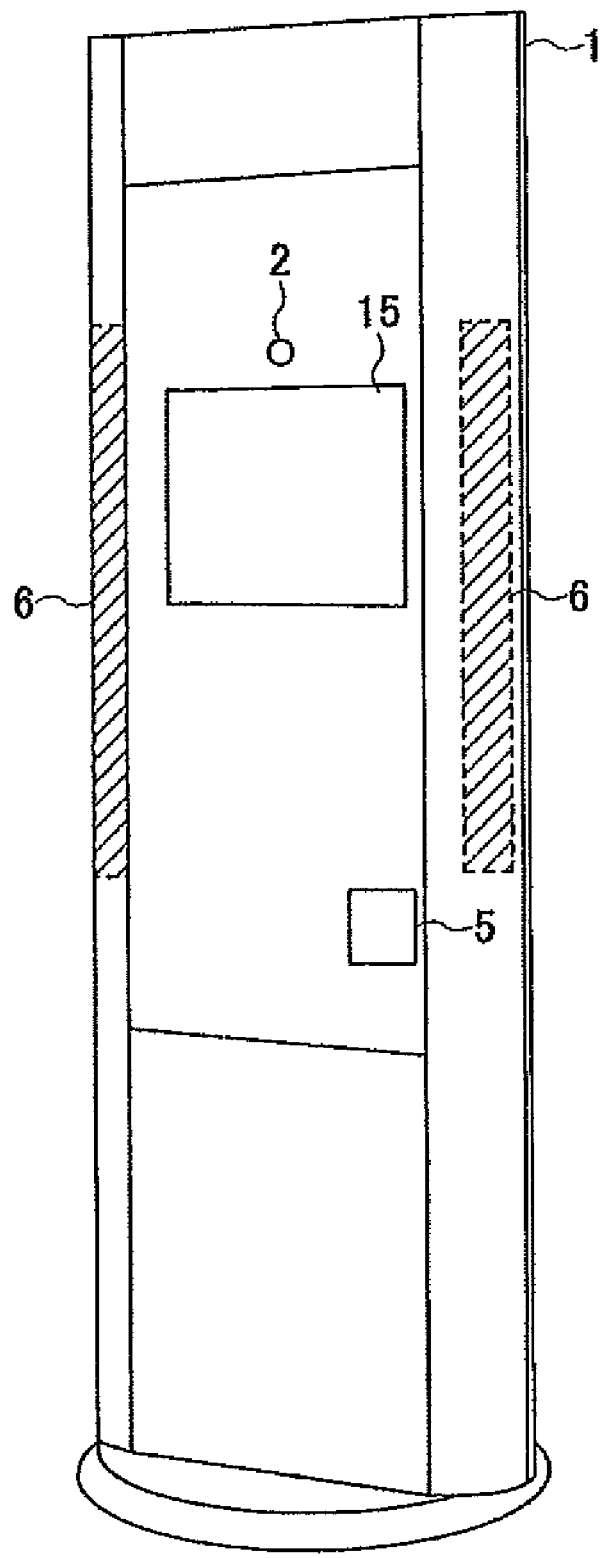
FIG. 7 is an external view of a fourth embodiment of the makeup simulator according to the present invention.
Figure 8:
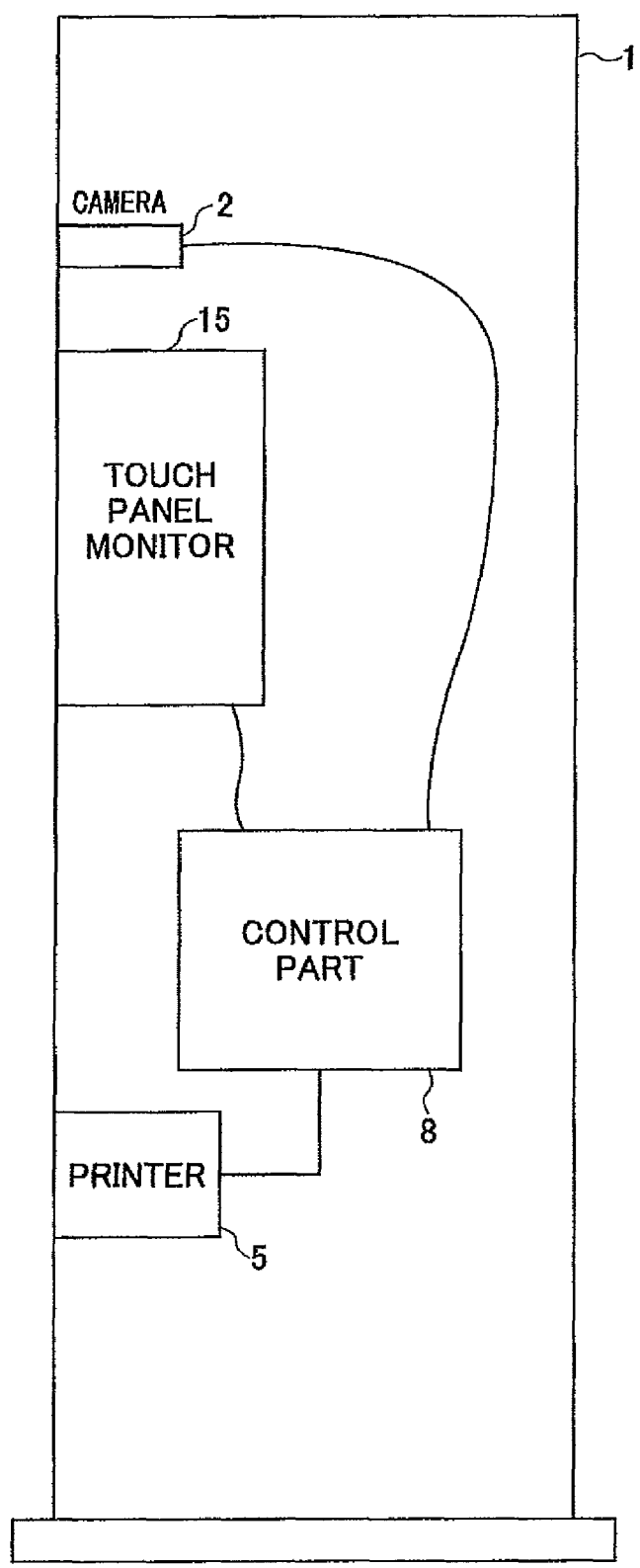
FIG. 8 is a cross-sectional view of the fourth embodiment of the makeup simulator.

FIG. 7 is an external view of a fourth embodiment of the makeup simulator according to the present invention. FIG. 8 is a cross-sectional view of the fourth embodiment of the makeup simulator. The same parts as those of the previous drawings are assigned the same reference numerals. The makeup simulator 1 includes the camera 2, the printer 5, the lights 6, and a touch panel monitor 15.

The makeup simulator 1 of FIG. 7 and FIG. 8 is different from the makeup simulator 1 of FIG. 1 and FIG. 2 in including the touch panel monitor 15 in place of the operations panel 4 and the monitor 7. The touch panel monitor 15 functions as the operations panel 4 and the monitor 7.

The touch panel monitor 15 displays an operation image and outputs operation information in response to reception of an operation from a user. The touch panel monitor 15 displays an operation image output from the control part 8 and outputs operation information to the control part 8 in response to reception of an operation from a user. The touch panel monitor 15 displays a video (main image) output from the control part 8. The control part 8 receives a video output from the camera 2, applies makeup on a user's face included in the video by performing image processing on the video as described below, and outputs the video to the touch panel monitor 15.

The makeup simulator 1 of FIG. 7 and FIG. 8, which is based on a mirror, an item indispensable for makeup, as a concept, has the function of interacting with a user. That is, the makeup simulator 1 has the characteristic of giving a user a natural feeling as if the user were putting on makeup, looking at a mirror.

The makeup simulator 1 performs image processing on a video output from the camera 2 in the control part 8, thereby applying makeup on a user's face included in the image, and displays the video on the touch panel monitor 15, which is a digital mirror. The makeup simulator 1 is capable of displaying various merchandise and cosmetic information items and the imaginary image of a user's face with makeup applied on it on the touch panel monitor 15.

Figure 9:
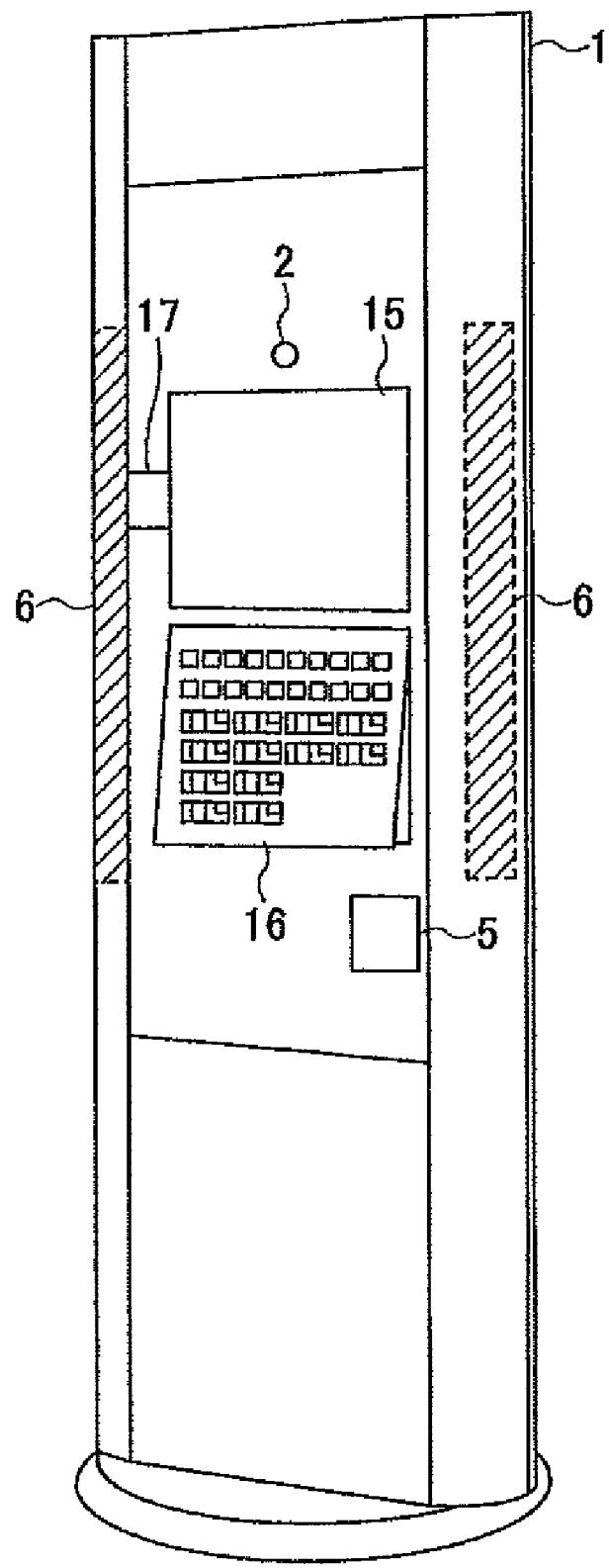
FIG. 9 is an external view of a fifth embodiment of the makeup simulator according to the present invention.
Figure 10:
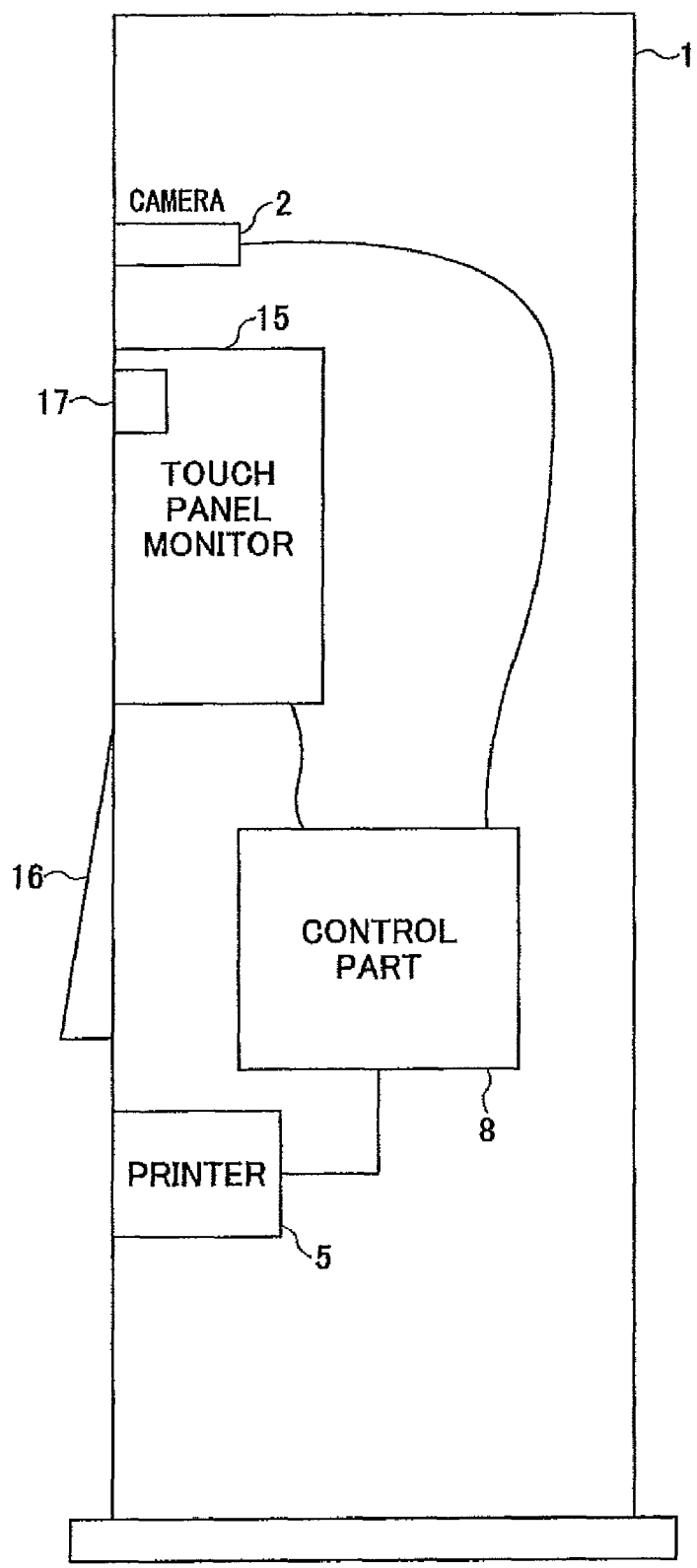
FIG. 10 is a cross-sectional view of the fifth embodiment of the makeup simulator.

The makeup simulator 1 of the fourth embodiment may be provided with, for example, a display case for displaying products for testers to be tried by a user (hereinafter referred to as tester products) as shown in FIG. 9 and FIG. 10 to be used as an enclosure for self-service selling. FIG. 9 is an external view of a fifth embodiment of the makeup simulator according to the present invention. FIG. 10 is a cross-sectional view of the fifth embodiment of the makeup simulator according to the present invention. The same parts as those of the previous drawings are assigned the same reference numerals.

The makeup simulator 1 includes the camera 2, the printer 5, the lights 6, the touch panel monitor 15, a display case 16, and an IC tag reader/writer 17. The makeup simulator 1 of FIG. 9 and FIG. 10 is different from the makeup simulator 1 of FIG. 7 and FIG. 8 in including the display case 16 and the IC tag reader/writer 17.

The display case 16 is for exhibiting multiple tester products. The tester products have IC (RFID) tags attached thereto. The IC tags attached to the tester products contain identification information by which the tester products can be identified. A tester product is taken out of the display case 16 and brought close to the IC tag reader/writer 17 by a user, so that the IC tag reader/writer 17 reads the identification information of the tester product from the IC tag.

The IC tag reader/writer 17 transmits the identification information of a tester product read from the IC tag to the control part 8. The control part 8 receives a video output from the camera 2 and performs image processing on the video as described below, thereby outputting to the touch panel monitor 15 the imaginary image of a user's face included in the video and made up using the tester product corresponding to the identification information read from the IC tag.

A correspondence table that correlates tester products with corresponding identification information may be provided in the makeup simulator 1 or in another apparatus from which the makeup simulator 1 can obtain the correspondence table via a network.

Further, with respect to the makeup simulator 1 of FIG. 9 and FIG. 10, the case of using an IC tag in order to identify a tester product is shown, but a barcode, two-dimensional code, or label may also be used. Further, the makeup simulator 1 of FIG. 9 and FIG. 10 may have a scheme that enables identification of an extracted tester product (for example, position recognition using a sensor such as an optical sensor) provided in the display case 16 so that the display case 16 sends a notification to the control part 8.

The makeup simulator 1 of FIG. 9 and FIG. 10, which is based on a mirror, an item indispensable for makeup, as a concept, has the function of interacting with a user. That is, the makeup simulator 1 has the characteristic of giving a user a natural feeling as if the user were putting on makeup, looking at a mirror.

The makeup simulator 1 performs image processing on a video output from the camera 2 in the control part 8, and displays the imaginary image of a user's face included in the video and made up using a tester product selected from the display case 16 by the user on the touch panel monitor 15, which is a digital mirror. The makeup simulator 1 is capable of displaying various merchandise and cosmetic information items and the imaginary image of a user's face with makeup applied on it on the touch panel monitor 15. The makeup simulator 1 is capable of obtaining data such as a user's preferences by logging the tester product selected from the display case 16 by the user.

For example, if the makeup simulator 1 is provided with a shelf for displaying not only tester products but also items for sale, the makeup simulator 1 can be used effectively as an enclosure for self-service selling by displaying items for sale displayed on the touch panel monitor 15 on the shelf.

Figure 11:
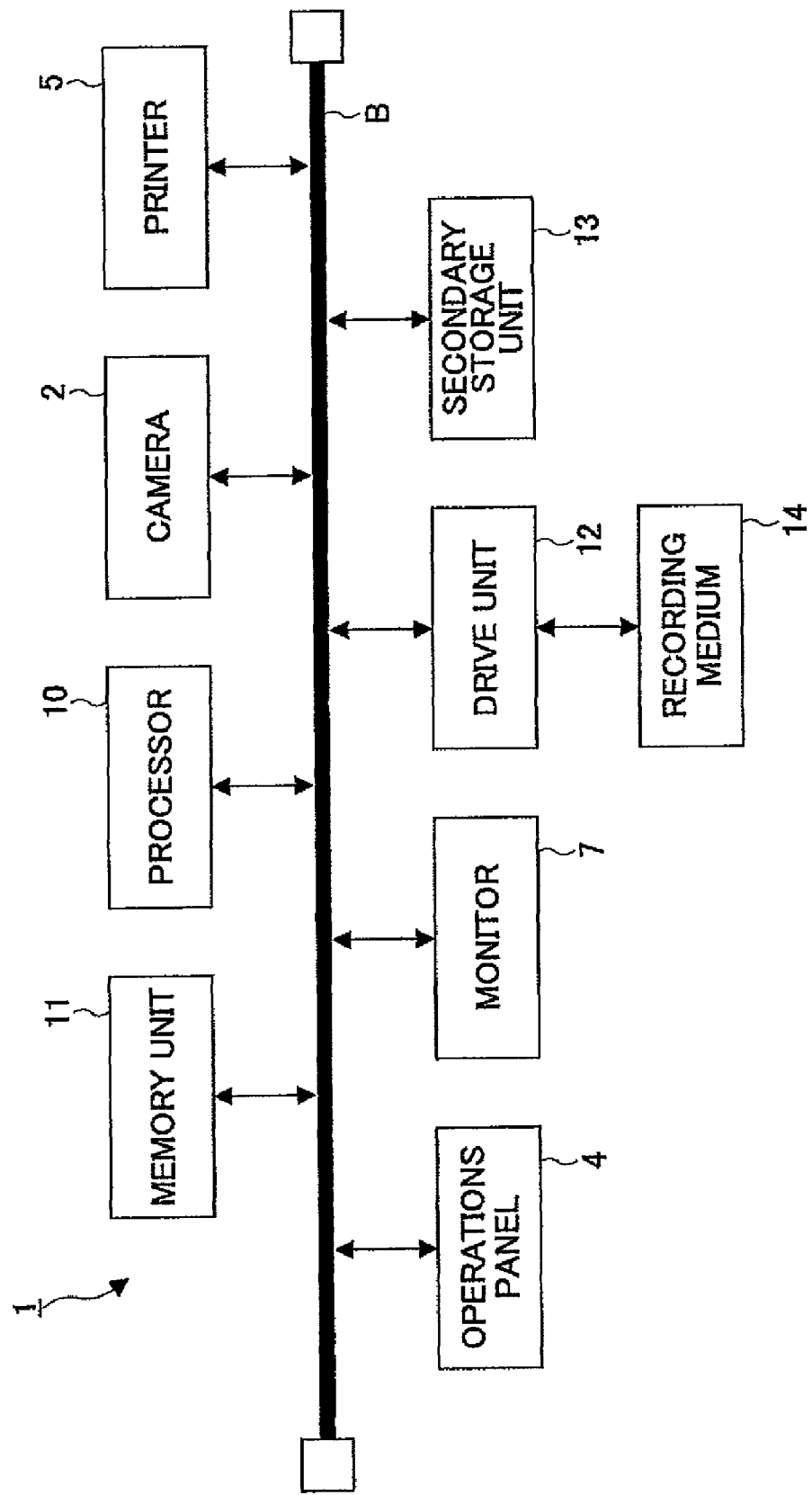
FIG. 11 is a hardware configuration diagram of the fifth embodiment of the makeup simulator.

A description is given below, taking the makeup simulator 1 of the first embodiment as an example. FIG. 11 is a hardware configuration diagram of an embodiment of the makeup simulator. The same parts as those of FIG. 1 and FIG. 2 are assigned the same reference numerals.

The makeup simulator 1 of FIG. 11 includes the camera 2, the operations panel 4, the printer 5, the monitor 7, a processor 10, a memory unit 11, a drive unit 12, and a secondary storage unit 13, which are connected to one another via a bus B. The processor 10, the memory unit 11, the drive unit 12, and the secondary storage unit 13 form the control part 8 of FIG. 2.

A makeup simulation program of the present invention is at least part of various programs that control the makeup simulator 1. The makeup simulation program is provided through distribution of a recording medium 14, for example.

Various types of recording media, such as recording media on which information is optically, electrically, or magnetically recorded, such as a CD-ROM, a flexible disk, and a magneto-optical disk, and semiconductor memories on which information is electrically recorded, such as a ROM and a flash memory, are usable as the recording medium 14 on which the makeup simulation program is recorded.

Further, when the recording medium 14 having the makeup simulation program recorded thereon is loaded into the drive unit 12, the makeup simulation program is installed in the secondary storage unit 13 from the recording medium 14 through the drive unit 12. The secondary storage unit 13 stores the installed makeup simulation program and stores necessary files and data. The memory unit 11 reads the makeup simulation program from the secondary storage unit 13 and stores it at the time of a startup. The processor 10 implements processing as described below in accordance with the makeup simulation program contained in the memory unit 11.

Figure 12:
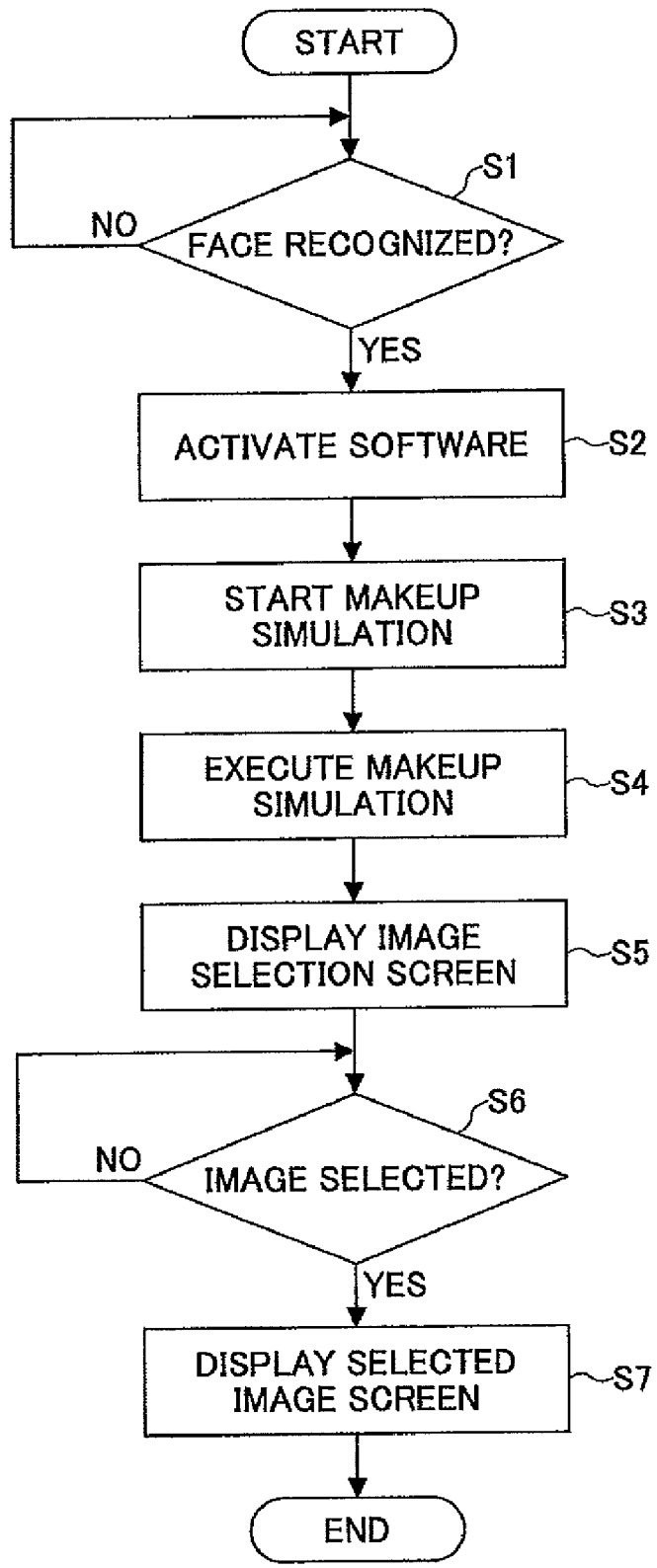
FIG. 12 is a flowchart showing the outline of processing performed by the makeup simulator.
Figure 13:
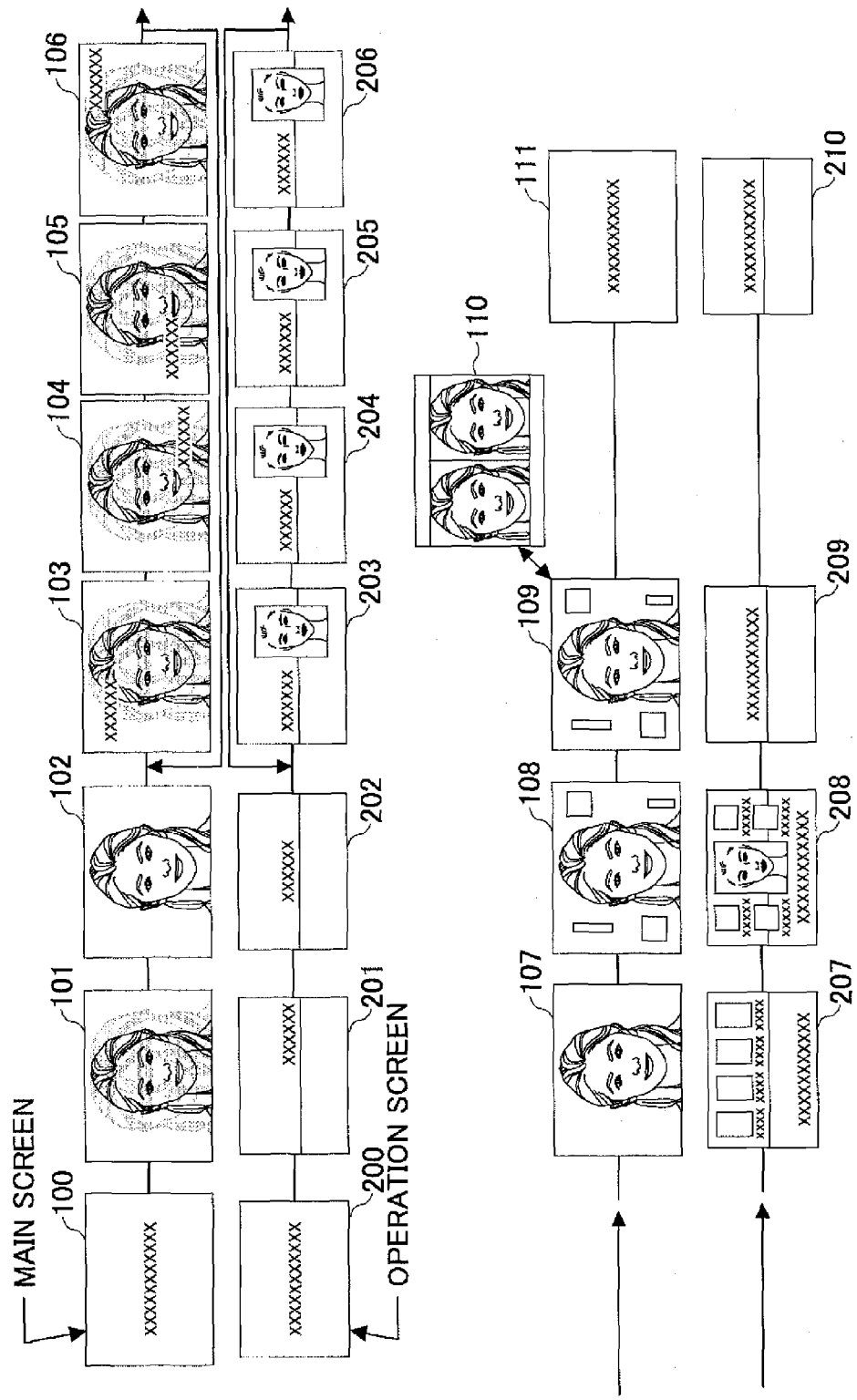
FIG. 13 is an image diagram of a main screen displayed on a monitor and an operation screen displayed on an operations panel.

FIG. 12 is a flowchart of one embodiment, showing the outline of processing performed by the makeup simulator. FIG. 13 is an image diagram of a main screen displayed on the monitor and an operation screen displayed on the operations panel. Screen images 100 through 111 of FIG. 13 are those of the main screen displayed on the monitor 7. Screen images 200 through 210 are those of the operation screen displayed on the operations panel 4.

The control part 8 is continuously receiving a video captured by the camera 2. At this point, the control part 8 displays the screen image 100 on the monitor 7 and the screen image 200 on the operations panel 4. The screen images 100 and 200 show the case of displaying screen savers.

Proceeding to step S1, the control part is continuously determining whether a user's face is included in the received video. The control part 8 repeatedly performs the processing of step S1 (NO in S1) until it recognizes that a user's face is included in the video.

If the control part 8 recognizes that a user's face is included in the video (YES in S1), it proceeds to step S2 to activate software containing a makeup simulation program for performing a makeup simulation. At this point, the control part 8 displays the screen image 101 on the monitor 7, and displays the screen image 201 on the operations panel 4.

The screen image 101 shows the case of displaying the video of the user's face captured with the camera 2. The screen image 201 shows the case of displaying a WELCOME message that moves laterally.

Proceeding to step S3, the control part 8 starts a makeup simulation based on the software activated in step S2. At this point, the control part 8 displays the screen image 102 on the monitor 7 and displays the screen image 202 on the operations panel 4. The screen image 102 shows the case of displaying the video of the user's face captured with the camera 2 with a magic mirror-like effect on it. The screen image 202 shows the case of displaying a WELCOME message that moves laterally the same as the screen image 201.

Proceeding to step S4, the control part 8 performs a makeup simulation as described below. At this point, the control part 8 successively displays the screen images 103 through 106 on the monitor 7 and displays the screen images 203 through 206 on the operations panel 4.

The screen images 103 through 106 show the case of displaying the user's face with four makeup patterns (images) applied thereon by the makeup simulation. The screen images 203 through 206 show the case of displaying the contents (for example, names) of the makeup patterns of the screen images 103 through 106 displayed on the monitor 7 then. The control part 8 successively displays the screen images 103 through 106 on the monitor 7 and displays the screen images 203 through 206 on the operations panel 4 until a predetermined period of time passes or the user touches the operations panel 4.

If a predetermined period of time passes or the user touches the operations panel 4, the control part 8 proceeds to step S5 to display the screen image 107 on the monitor 7 and display the screen image 207 on the operations panel 4. Like the screen image 101, the screen image 107 shows the case of displaying the video of the user's face captured with the camera 2. The screen image 207 shows the case of displaying an image selection screen where one image is selectable from the four makeup patterns (images). The user can select one image from the image selection screen by operating the operations panel 4.

Proceeding to step S6, the control part 8 repeatedly performs the processing of step S6 (NO in S6) until one image is selected from the image selection screen. If the user selects one image from the image selection screen, the operations panel 4 outputs operation information to the control part 8 in response to reception of the operation from the user.

If the control part 8 determines that the user has selected one image from the image selection screen (YES in S6), the control part 8 proceeds to step S7 to display the image screen of the selected image on the monitor 7 and the operations panel 4. At this point, the control part 8 displays the screen image 108 on the monitor 7 and displays the screen image 208 on the operations panel 4.

The screen image 108 shows the case of successively displaying the imaginary image of the made-up user's face with different color patterns applied thereon and merchandise information for doing makeup like the imaginary image based on the one image selected from the image selection screen. The screen image 208 shows the case of displaying the contents of the one image selected from the image selection screen and merchandise information for doing makeup like the imaginary image of the screen image 108 displayed on the monitor 7 at that point.

The user can also give an instruction for printing out by operating the operations panel 4. In response to reception of a PRINT OUT instruction from the user, the control part 8 displays the screen image 109 on the monitor 7 and displays the screen image 209 on the operations panel 4. The screen image 109 shows the case of displaying an imaginary image to be printed out. The screen image 209 shows the case of displaying a comment of NOW PRINTING. The control part 8 controls the printer 5 to print out the imaginary image displayed on the monitor 7.

Further, the user can also give an instruction to display and print out a comparison screen including imaginary images before and after makeup by operating the operations panel 4. In response to reception of an instruction to display the comparison screen from the user, the control part 8 displays the screen image 110 on the monitor 7. The screen image 110 shows the case of displaying the comparison screen including imaginary images before and after makeup. In response to reception of a PRINT OUT instruction from the user while displaying the comparison screen, the control part 8 controls the printer 5 to print out the comparison screen displayed on the monitor 7.

When the makeup simulation by the user ends, the control part 8 displays the screen images 111 and 210, which are screen savers, on the monitor 7 and the operations panel 4, and ends the processing.

In the case of FIG. 12 and FIG. 13, four images are displayed by the makeup simulation. However, images other than the four may be displayed. Further, the case of applying makeup on a user's face included in a video output from the camera 2 is shown, but the makeup simulator 1 may store a precaptured video in the secondary storage unit 13 as a video file and apply makeup on a user's face included in the video file.

Figure 14:
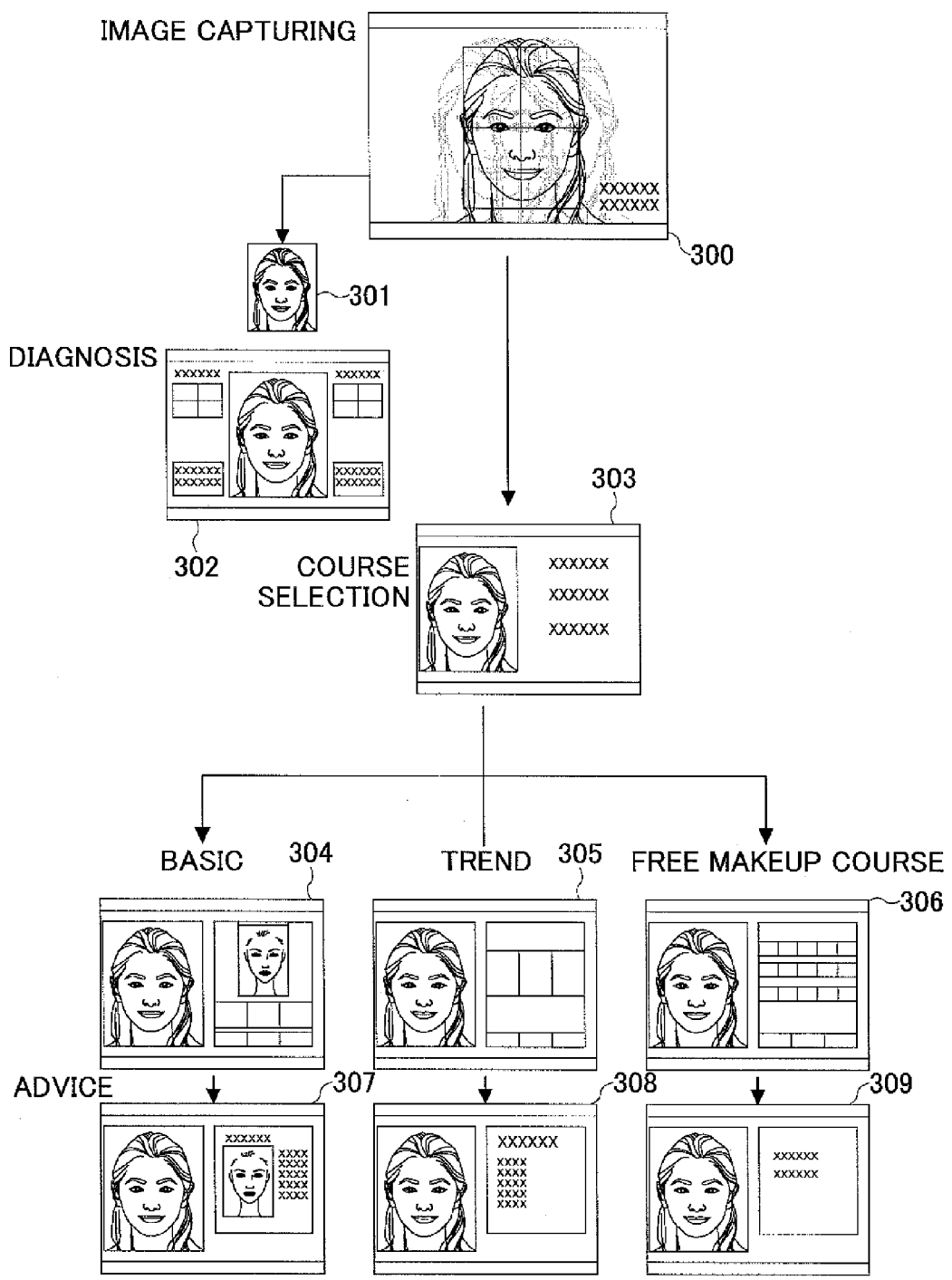
FIG. 14 is an image diagram showing other processing performed by the makeup simulator than makeup simulation.

The makeup simulator 1 is also capable of using a video output from the camera 2 for other than a makeup simulation. FIG. 14 is an image diagram showing processing performed by the makeup simulator other than makeup simulation.

A screen image 300 shows the case of displaying the video of a user's face captured with the camera 2. The makeup simulator 1 recognizes the user's face included in the video, and cuts out a still image 301 of the user's face.

The makeup simulator 1 is capable of making a features diagnosis and a skin color diagnosis on the still image 301 based on a features analysis logic and a skin analysis logic and displaying a screen image 302 showing their results on the monitor 7. Making a features diagnosis and a skin color diagnosis on the still image 301 based on a features analysis logic and a skin analysis logic is a known technique described in, for example, Japanese Laid-Open Patent Application No. 2001-346627.

Further, the makeup simulator 1 is capable of displaying a course selection screen 303 like a screen image 303 on the monitor 7 and causing a user to select a course (for example, TREND, BASIC, or FREE). The makeup simulator 1 displays screen images 304 through 309 based on the course selected by the user on the monitor 7, and performs a simulation and give advice.

The screen images 304 through 306 show the case of displaying the respective simulation screens of the courses. The screen images 307 through 309 show the case of displaying the respective advice screens of the courses.

For example, the BASIC course simulates and advises on an optimum makeup technique based on the results of the features diagnosis and the skin color diagnosis. Further, the TREND course simulates and advises on a makeup of the latest trend. Further, the FREE MAKEUP course simulates and advises on items corresponding to the individual parts of the eyes, mouth, cheeks, and eyebrows.

The control part 8 is also capable of controlling the printer 5 to print out a simulation screen or an advice screen displayed on the monitor 7 in response to a PRINT OUT instruction from a user while displaying the simulation screen or the advice screen.

Figure 15:
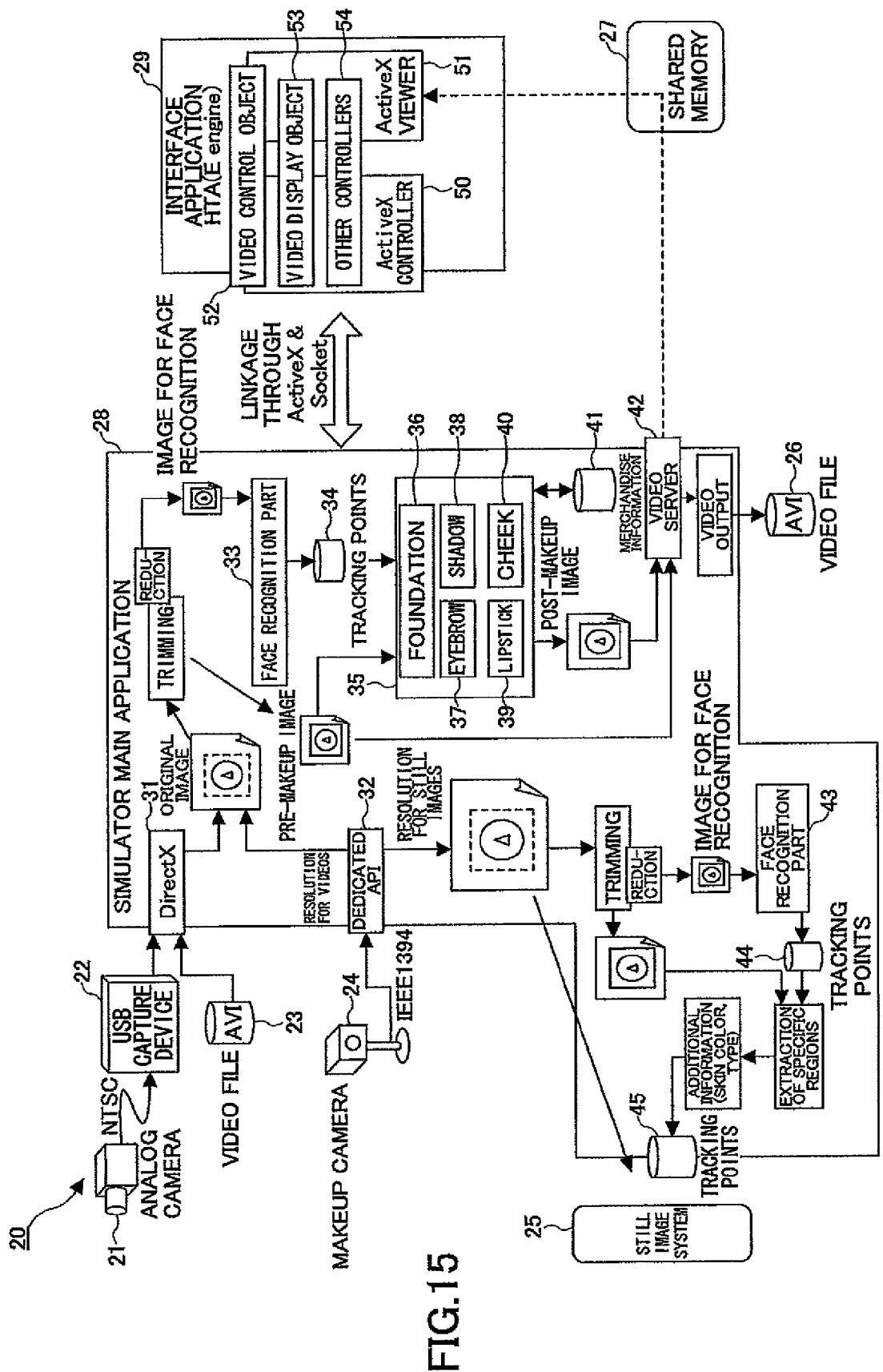
FIG. 15 is a system configuration diagram of an embodiment of a makeup simulation system according to the present invention.

Next, a description is given of the details of a makeup simulation system for implementing the makeup simulator as described above. FIG. 15 is a system configuration diagram of an embodiment of a makeup simulation system according to the present invention.

A makeup simulation system 20 of FIG. 15 includes an analog camera 21, a USB capture device 22, a video file 23, a makeup camera 24, a still image system 25, a video file 26, a shared memory 27, a simulator main application 28, and an interface application 29.

The analog camera 21 outputs, for example, a captured NTSC video through the USB capture device 22. The video output from the USB capture device 22 is input to the simulator main application 28 using a DirectX 31 as an example API (application programming interface), for example. Further, the video file 23 is also input to the simulator main application 28 using the DirectX 31. The makeup camera 24 outputs a captured video through IEEE 1394 as an example serial interface. The video output from the makeup camera 24 is input to the simulator main application 28 using a dedicated API 32. The simulator main application 28 obtains an original image of a resolution for videos and a still image of a resolution for still images from the video input using the dedicated API 32.

The simulator main application 28 employs the video and the video file 23 input using the DirectX 31 and the video of the resolution for videos obtained from the video input using the dedicated API 32 as an original image, and trims and reduces the original image.

The simulator main application 28 obtains a pre-makeup image by trimming the original image. Further, the simulator main application 28 obtains an image for face recognition by reducing the original image. A face recognition part 33 obtains tracking points 34 for recognizing a user's face as described below from the image for face recognition by FFT (fast Fourier transform).

A makeup processing part 35 obtains a post-makeup image by applying a makeup formed of foundation, eyebrow, shadow, lipstick, and cheek on the user's face included in the pre-makeup image based on the tracking points 34. The makeup processing part 35 includes a foundation processing part 36, an eyebrow processing part 37, a shadow processing part 38, a lipstick processing part 39, and a cheek processing part 40.

The makeup processing part 35 is capable of including merchandise information 41 for doing makeup like the post-makeup image in the post-makeup image. A video server 42 is capable of writing the pre-makeup image and the post-makeup image into the shared memory 27 and also outputting the pre-makeup image and the post-makeup image as the video file 26.

The interface application 29 includes a video control object 52, a video display object 53, and other controllers 54 that use an ActiveX controller 50 and an ActiveX viewer 51. The interface application 29 and the simulator main application 28 are linked through ActiveX and Socket.

The interface application 29 is capable of displaying the pre-makeup image and the post-makeup image written into the shared memory 27 on the above-described monitor 7 using the ActiveX viewer 51.

The simulator main application 28 trims and reduces the still image of the resolution for still images obtained from the video input using the dedicated API 32. The simulator main application 28 trims the still image of the resolution for still images. Further, the simulator main application 28 reduces the still image of the resolution for still images, thereby obtaining an image for face recognition. A face recognition part 43 obtains tracking points 44 as described below for recognizing the user's face from the image for face recognition.

The simulator main application 28 extracts specific regions from the user's face included in the trimmed video based on the tracking points 44, obtains additional information to be used for a features diagnosis and a skin color diagnosis, such as a type and a skin color, from the specific regions, and outputs tracking points 45, which are the tracking points 44 plus the additional information, and the still image of the resolution for still images obtained from the video input using the dedicated API 32 to the still image system 25.

The still image system 25 is capable of making a features diagnosis and a skin color diagnosis on the still image 301 based on the above-described features analysis logic and skin analysis logic using the tracking points 45 and displaying the screen image 302 showing their results on the monitor 7. In addition, the still image system 25 is also capable of displaying the screen images 303 through 309 on the monitor 7.

Figure 16:
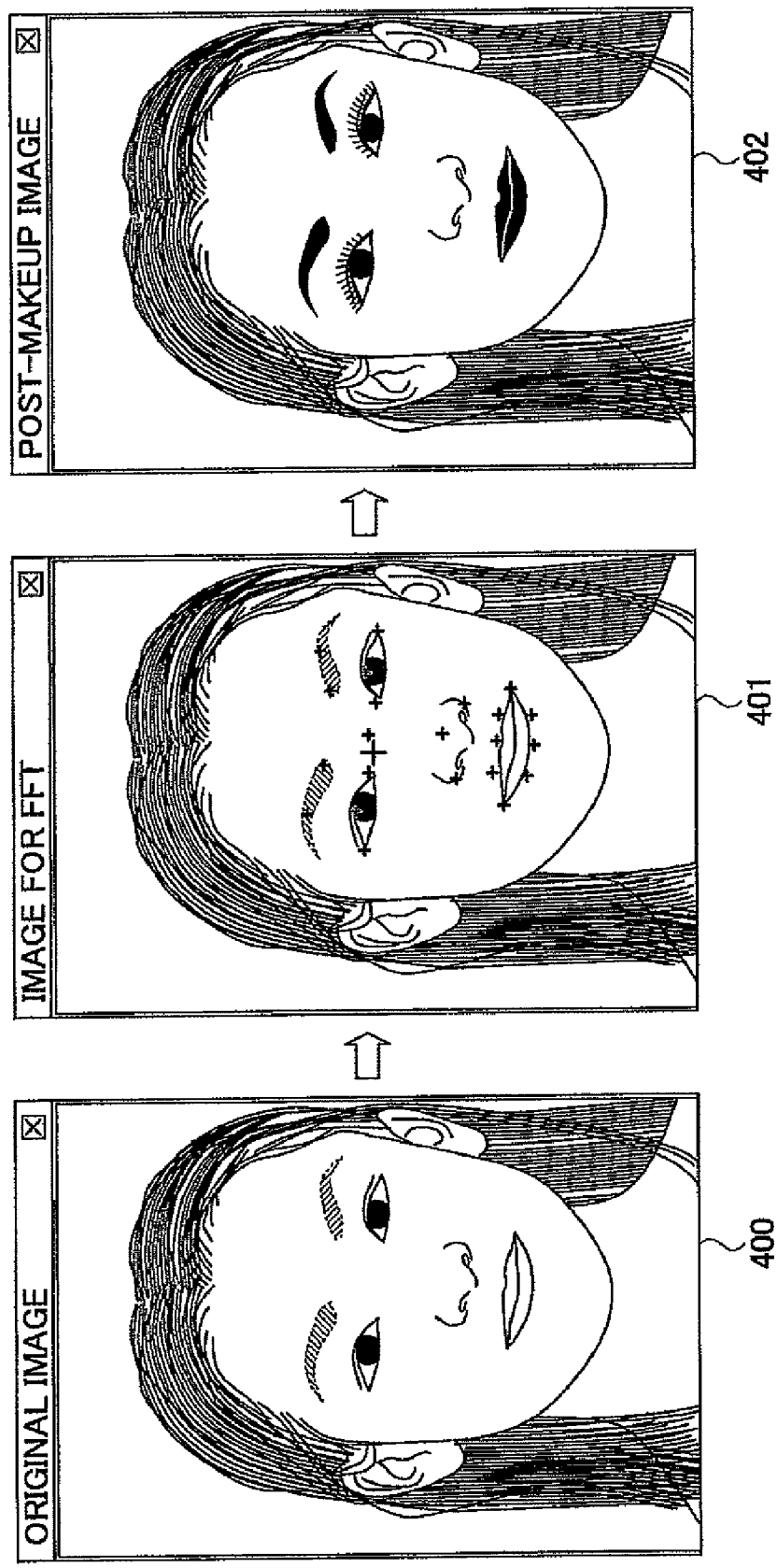
FIG. 16 is a screen image diagram showing processing performed by a simulator main application.

FIG. 16 is a screen image diagram showing processing performed by the simulator main application. A screen image 400 shows the case of displaying a pre-makeup image. The screen image 401 shows the case of displaying the tracking points 34 obtained from the image for face recognition over the pre makeup image. Further, the screen image 402 shows the case of displaying a post-makeup image where a makeup is applied on the user's face included in the pre-makeup image based on the tracking points 34.

Of the processing performed by the simulator main application 28, face recognition and makeup processing are described in order below in detail with reference to the drawings. In this embodiment, a description is given of makeup processing composed of foundation processing, eyebrow processing, shadow processing, lipstick processing, and cheek processing as an example of the makeup processing. However, the combination may be different.

[Face Recognition]

Figure 17:
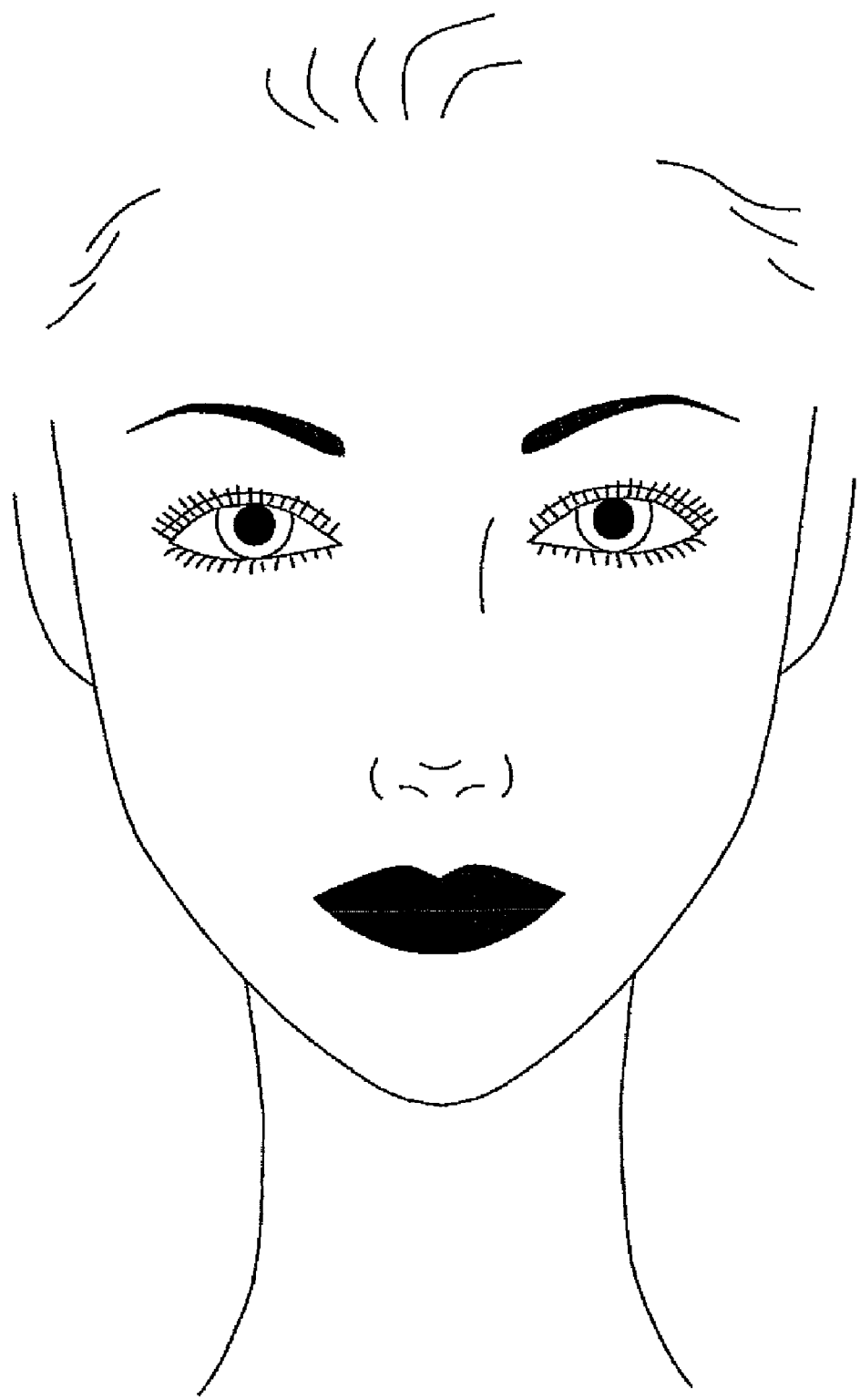
FIG. 17 is the imaginary image of a user's face included in a pre-makeup image.
Figure 18:
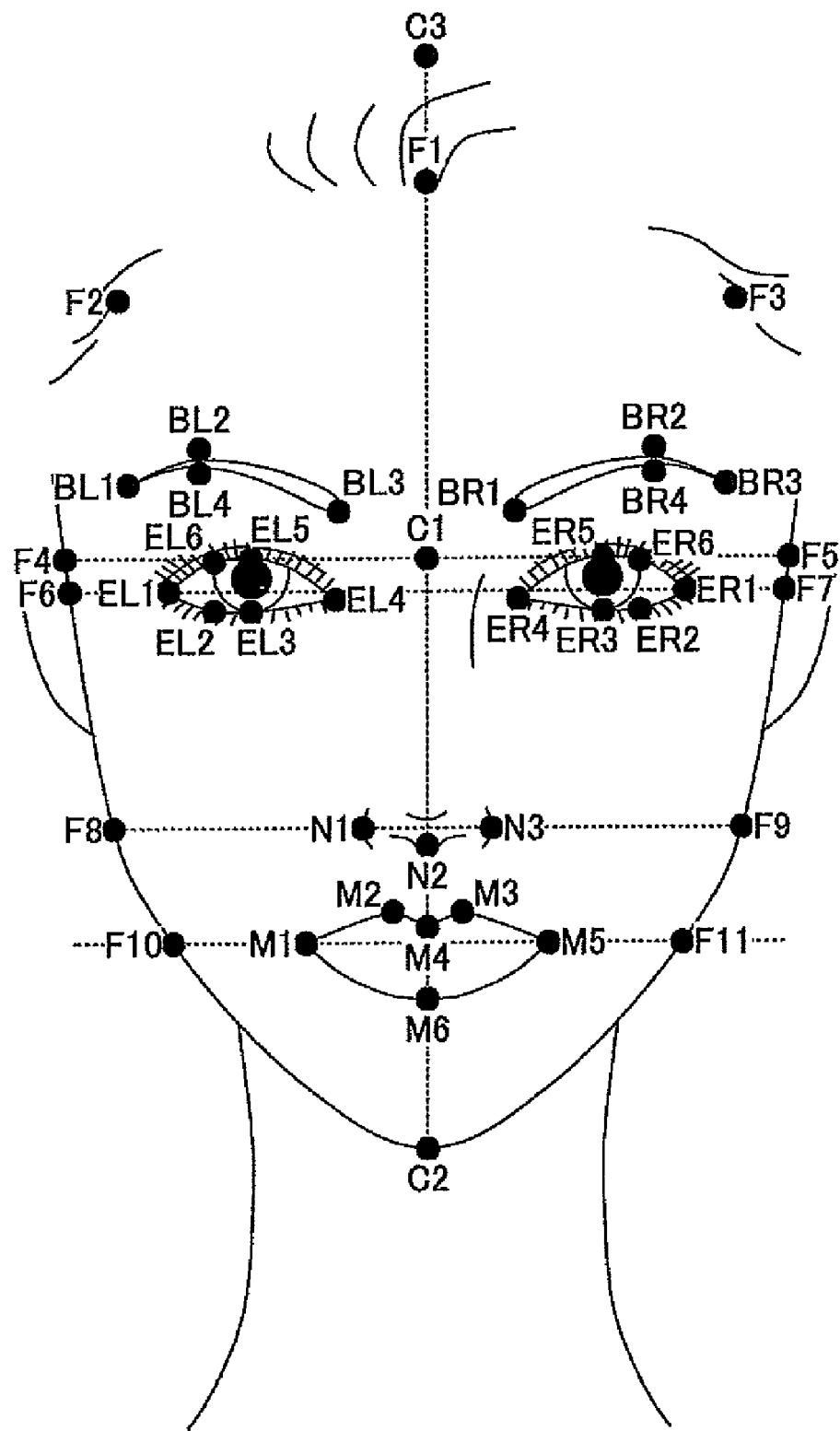
FIG. 18 is an image diagram showing tracking points.

FIG. 17 is the imaginary image of a user's face included in a pre-makeup image. FIG. 18 is an image diagram showing tracking points. The face recognition part 33 of the simulator main application 28 obtains 45 tracking points 34 for recognizing a user's face as in FIG. 18 from an imaginary image like FIG. 17. The tracking points 34 of FIG. 18 are an example, and may be adjusted in accordance with the processing capability of the control part 8 or the definition of the monitor 7.

By thus obtaining the tracking points 34 from a user's face included in the pre-makeup image, the makeup processing part 35 can set how to apply makeup and color in correlation with the tracking points 34 in a makeup processing parameter file as in FIG. 19.

FIG. 19 is a configuration diagram of a makeup processing parameter file. In the makeup processing parameter file of FIG. 19, how to apply makeup and color are set in correlation with the tracking points 34 with respect to each of the eyes, mouth, and cheeks. The makeup processing parameter file is determined for each makeup pattern (image). The makeup processing parameter file of FIG. 19 shows the case of CLASS ELEGANCE.

[Lipstick Processing]

Figure 20:
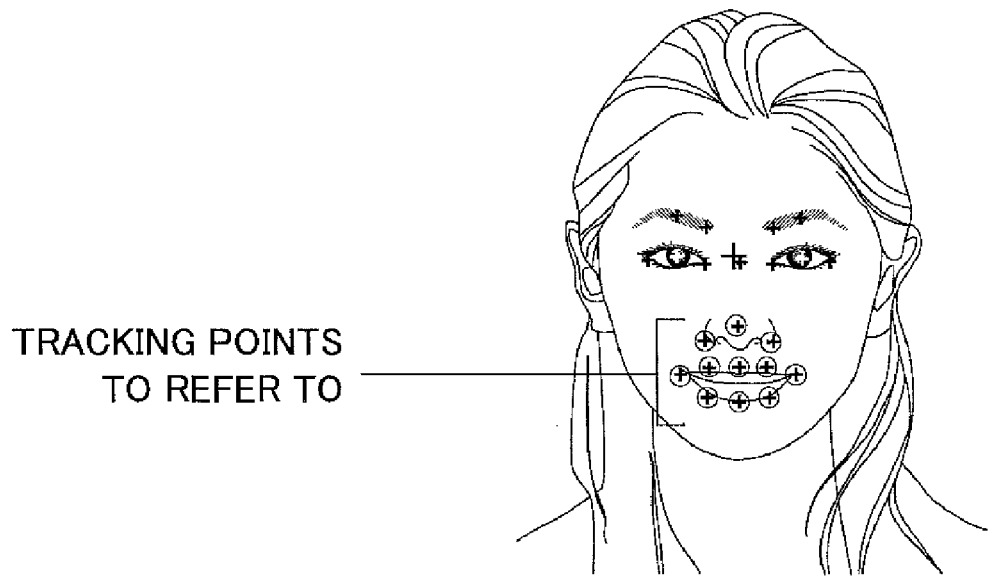
FIG. 20 is an image diagram showing the tracking points referred to by lipstick processing.

The lipstick processing part 39 included in the simulator main application 28 performs lipstick processing, referring to the tracking points 34, eight on the lips and three on the nose, as shown in FIG. 20. FIG. 20 is an image diagram showing the tracking points referred to by the lipstick processing.

Figure 21:
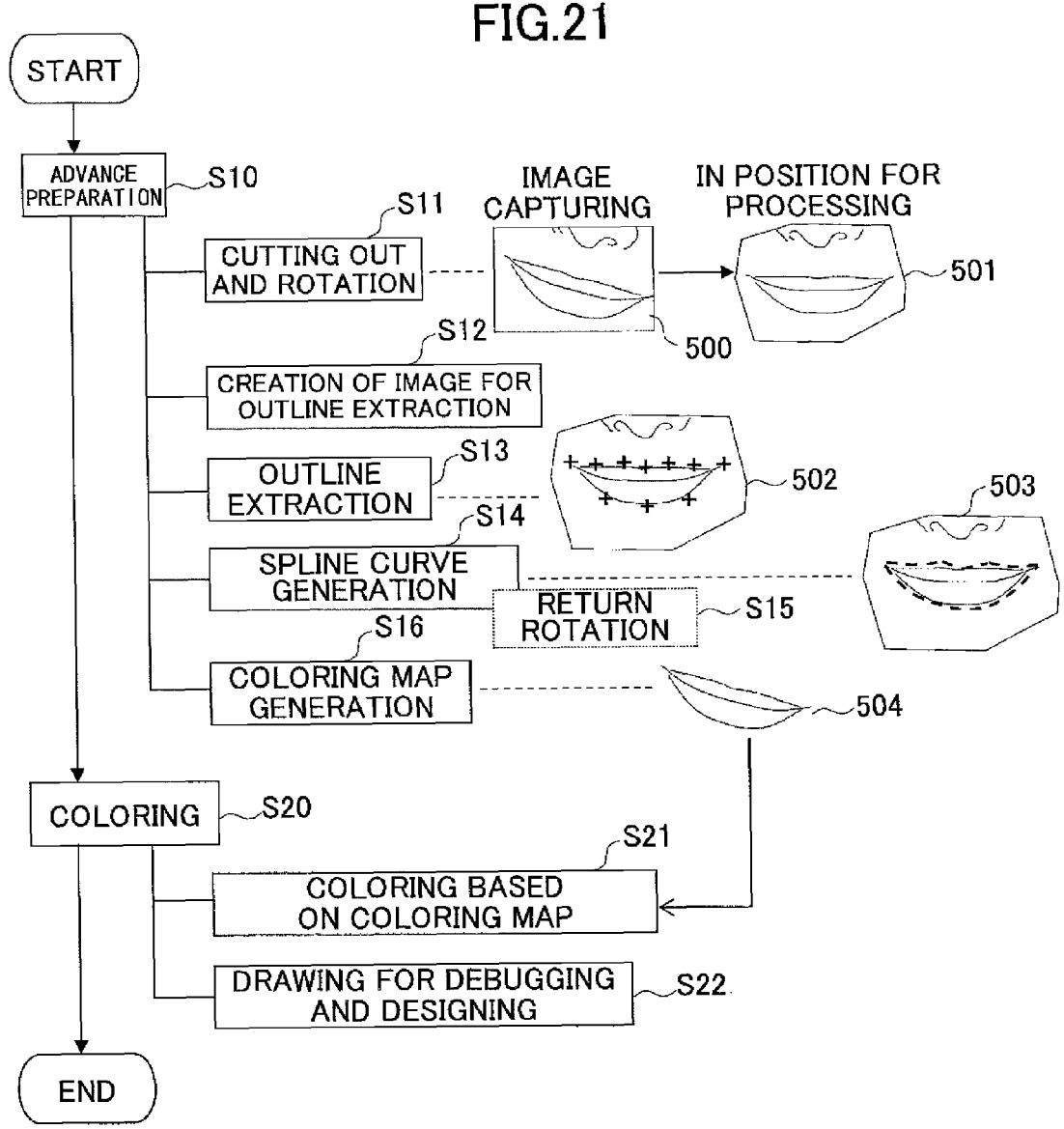
FIG. 21 is a flowchart showing the lipstick processing.

FIG. 21 is a flowchart showing the lipstick processing. Broadly speaking, the lipstick processing includes the advance preparation of step S10 and the coloring of step S20. The advance preparation includes the cutting out and rotation of step S11, the creation of an image for outline extraction of step S12, the outline extraction of step S13, the spline curve generation of FIG. 14, the return rotation of step S15, and the coloring map generation of step S16. The coloring includes the coloring-map-based coloring of step S21 and the drawing for debugging and designing of step S22.

Proceeding to the cutting out and rotation of step S11, the lipstick processing part 39 cuts out a partial image 500 containing the lips of the user's face from the image for face recognition, and obtains a partial image 501 by rotating the partial image 500 to a position for processing.

Proceeding to the creation of an Image for outline extraction of step S12, the lipstick processing part 39 creates an image for outline extraction from the partial image 501. Proceeding to the outline extraction of step S13, the lipstick processing part 39 extracts the outline of the lips from the image for outline extraction as points as shown in a partial image 502.

Figure 22:
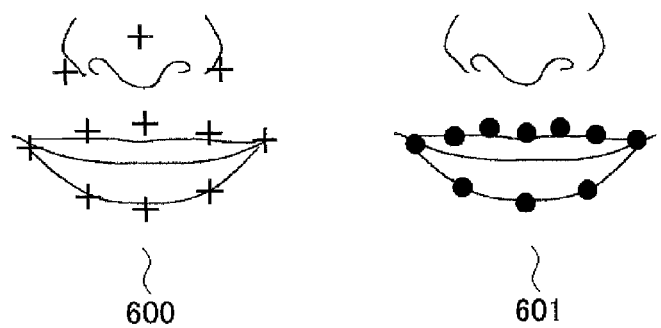
FIG. 22 is an image diagram showing outline extraction.

FIG. 22 is an image diagram showing the outline extraction. Eight tracking points and three tracking points are displayed over the lips and the nose, respectively, in an image for outline extraction 600. The lipstick processing part 39 conducts another search based on the eight lip tracking points and the three nose tracking points, and extracts the points of an image for outline extraction 601.

Figure 23:
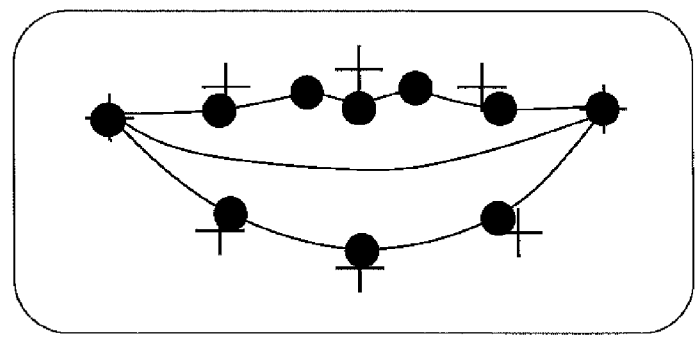
FIG. 23 is a screen comparing the eight lip tracking points and the three nose tracking points of an image for outline extraction 600 and the points of an image for outline extraction 601 re-searched for and extracted based on the eight lip tracking points and the three nose tracking points.

FIG. 23 is a screen comparing the eight lip tracking points and the three nose tracking points of the image for outline extraction 600 and the points of the image for outline extraction 601 re-searched for and extracted based on the eight lip tracking points and the three nose tracking points. If the above-described re-searching ends unsatisfactorily, the default points calculated from the eight lip tracking points and the three nose tracking points of the image for outline extraction 600 as in FIG. 24 are employed.

Figure 24:
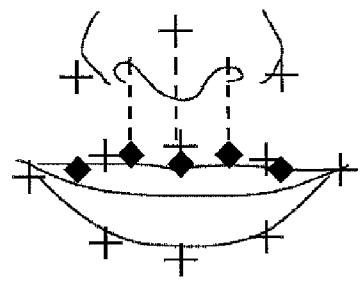
FIG. 24 is an image diagram showing processing for obtaining default points from the eight lip tracking points and the three nose tracking points.

FIG. 24 is an image diagram showing processing for obtaining default points from the eight lip tracking points and the three nose tracking points. The lipstick processing part 39 refers to the three nose tracking points, and determines default points with respect to the five points of the upper lip.

Figure 25:
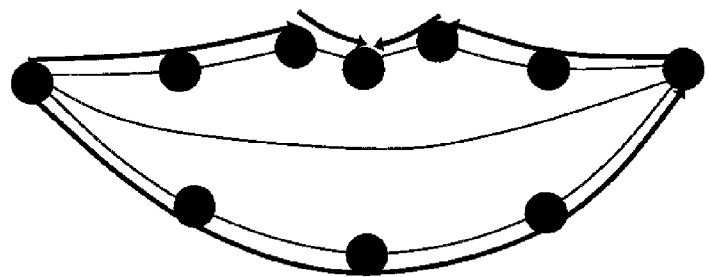
FIG. 25 is an image diagram showing the processing of completing an outline from the points or default points.

Proceeding to the spline curve generation of step S14, the lipstick processing part 39 interpolates the points of the image for outline extraction 601 or the default points as in FIG. 24 with quadratic splines, thereby completing the outline as shown in FIG. 25. FIG. 25 is an image diagram showing the processing of completing the outline from the points or default points. When the outline of the lips is completed like a partial image 503, the lipstick processing part 39 proceeds to step S15 and performs return rotation to reverse the rotation performed in the cutting out and rotation of step S11.

Figure 26:
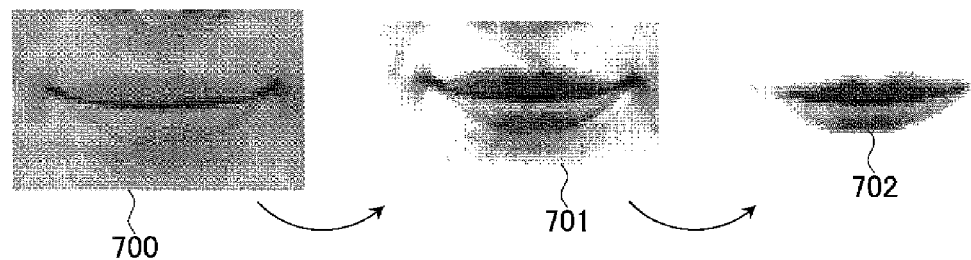
FIG. 26 is an image diagram showing coloring map generation.

Proceeding to the coloring map generation of step S16, the lipstick processing part 39 generates a coloring map determining the strength of coloring from the lightness and saturation of a partial image 700. FIG. 26 is an image diagram showing the coloring map generation. Specifically, the lipstick processing part 39 generates a gray scale image 701 that shows the strength of coloring from the lightness and saturation. The lipstick processing part 39 cuts out only a partial image 702 surrounded by the outline of the lips completed in the spline curve generation of step S14 from the gray scale image 701 as a coloring map 504.

Proceeding to the coloring-map-based coloring of step S21, the lipstick part 39 applies color to a pre-makeup image based on the coloring map 504 generated in the coloring map generation of step S16 and on how to apply makeup and a specified color set in a makeup processing parameter file like FIG. 19.

Figure 27:
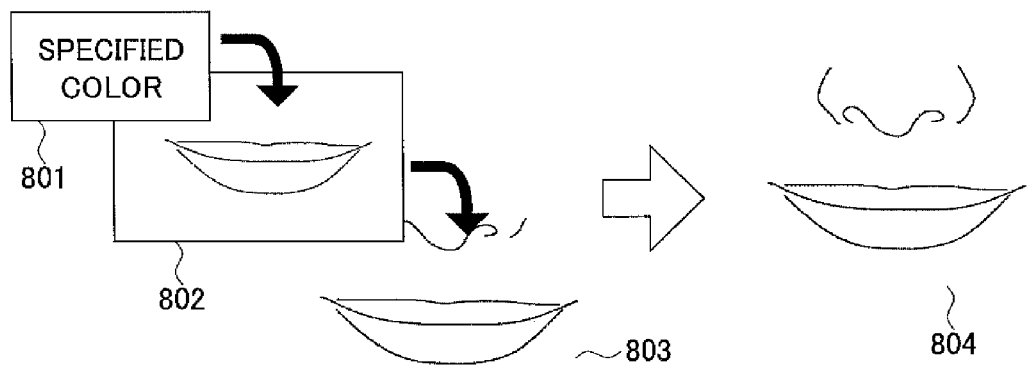
FIG. 27 is an image diagram showing coloring based on a coloring map.

FIG. 27 is an image diagram showing the coloring based on the coloring map. The lipstick processing part 39 applies color to a pre-makeup image 803 based on how to apply makeup and a specified color set in a makeup processing parameter file 801 like FIG. 19 and on a coloring map 802 generated in the coloring map generation of step S16, thereby obtaining a post-makeup image 804.

Then, proceeding to the drawing for debugging and designing of step S22, the lipstick processing part 39 performs drawing for debugging and designing, and thereafter ends the lipstick processing.

[Shadow Processing]

Figure 28:
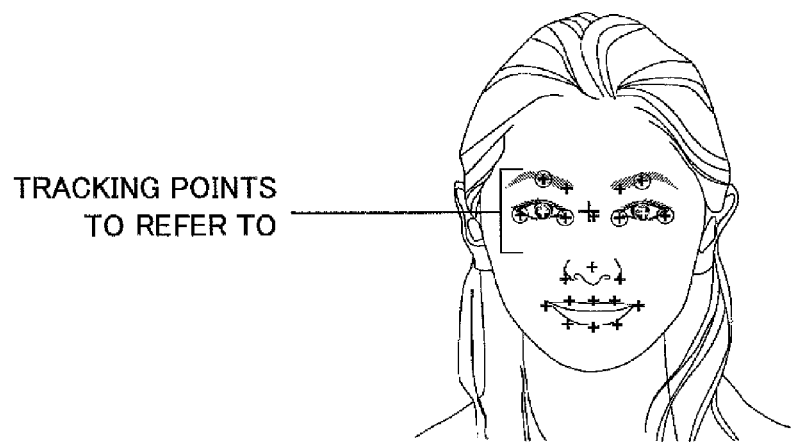
FIG. 28 is an image diagram showing the tracking points referred to by shadow processing.

The shadow processing part 38 included in the simulator main application 28 performs shadow processing, referring to the tracking points 34, three on the eye and one on the eyebrow, for each of the right side and the left side as shown in FIG. 28. FIG. 28 is an image diagram showing the tracking points referred to by the shadow processing.

Figure 29:
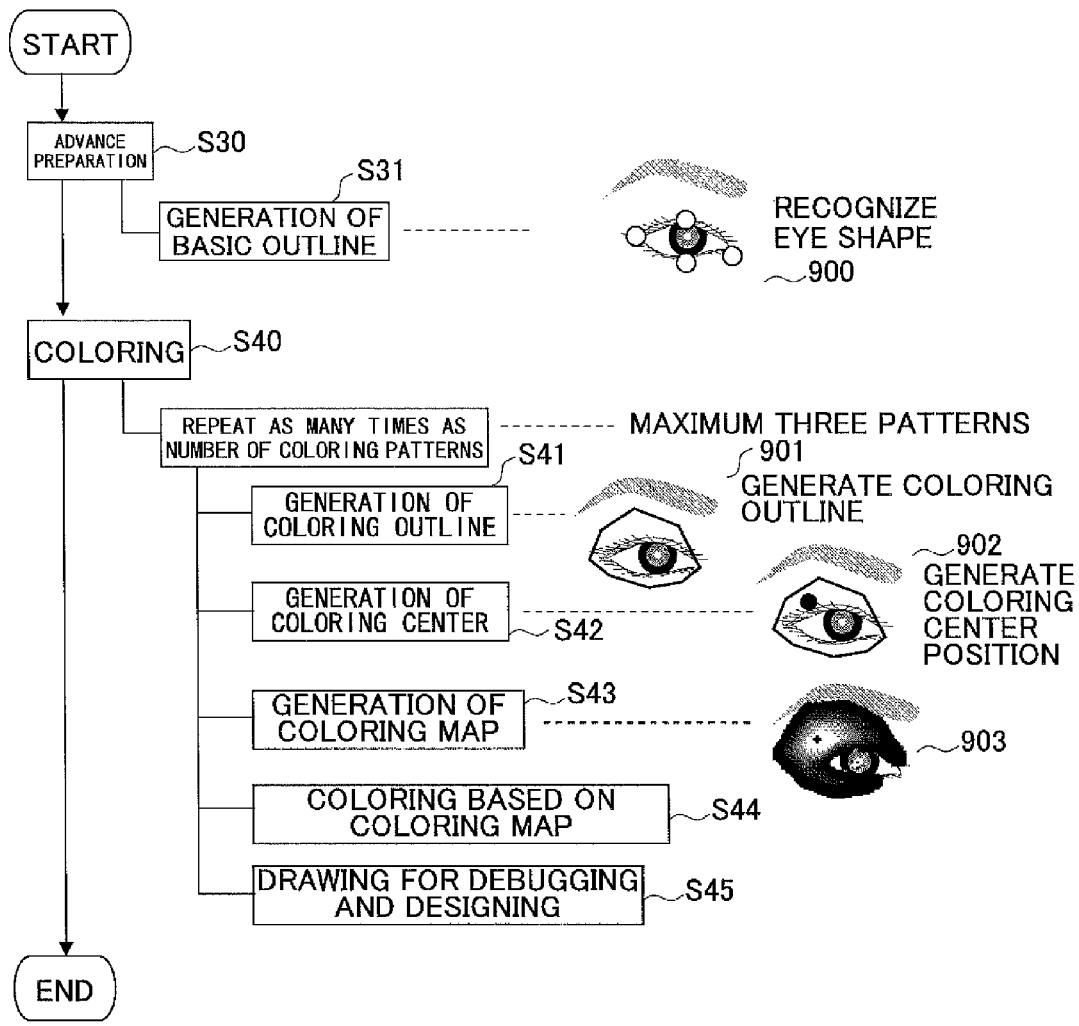
FIG. 29 is a flowchart showing the shadow processing.

FIG. 29 is a flowchart showing the shadow processing. Broadly speaking, the shadow processing includes the advance preparation of step S30 and the coloring of step S40. The advance preparation includes the basic outline generation of step S31.

The coloring includes the coloring outline generation of step S41, the coloring center generation of step S42, the coloring map generation of step S43, the coloring-map-based coloring of step S44, and the drawing for debugging and designing of step S45, which are repeated as many times as the number of coloring patterns.

Figure 30:
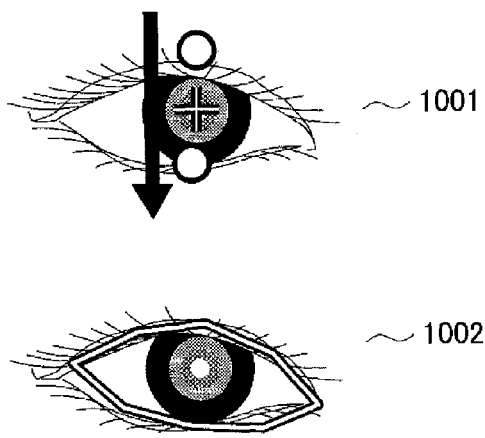
FIG. 30 is an image diagram showing basic outline generation.

Proceeding to the basic outline generation of step S31, the shadow processing part 38 obtains the shape of an eye of the user's face like a partial image 900 from the image for face recognition. FIG. 30 is an image diagram showing the basic outline generation.

The shadow processing part 38 searches upward and downward from the center of the eye and recognizes two points of the outline of the eye (upper-side boundary and lower-side boundary) as shown in a partial image 1001 in order to generate an outline to serve as the base of a coloring outline. The shadow processing part 38 adds four points generated by spline interpolation to the four points: the two recognized points of the eye outline, the outer corner of the eye, and the inner corner of the eye, and generates a polygon by the total of eight points like a partial image 1002.

Figure 31:
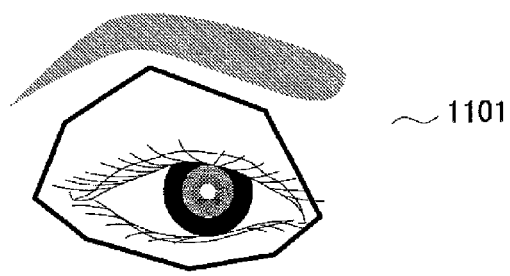
FIG. 31 is an image diagram showing coloring outline generation.

Proceeding to the coloring outline generation of step S41, the shadow processing part 38 generates a coloring outline like a partial image 901. FIG. 31 is an image diagram showing the coloring outline generation. The shadow processing part 38 generates a coloring outline based on the outer corner and the inner corner of the eye as shown in a partial image 1101 in order to generate the coloring outline. Parameters may be specified with a GUI for extending the outline or shifting vertexes.

Proceeding to the coloring center generation of step S42, the shadow processing part 38 generates the center position of coloring like "●" in a partial image 902. Proceeding to the coloring map generation of step S43, the shadow processing part 38 generates a coloring map determining the strength of coloring like a partial image 903.

Specifically, the coloring map generation determines the strength of application in correspondence to the distances from the coloring center to the sides of the polygon. For example, the shadow processing part 38 determines the coloring map so that the strength of application is reduced toward the sides. The coloring map generation is performed on the part between the coloring outline and the basic outline.

Figure 32:
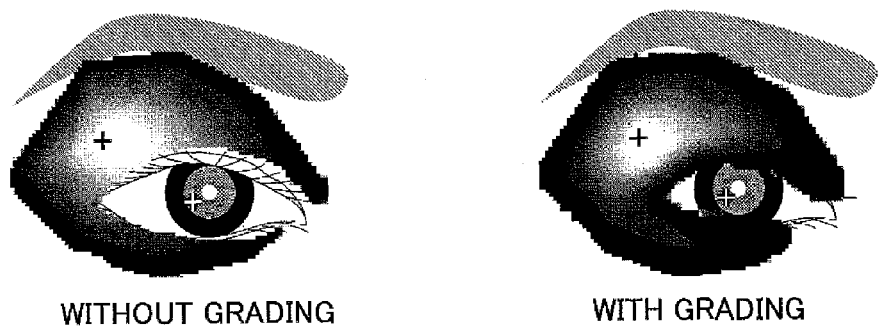
FIG. 32 is an image diagram showing the coloring map without grading and the coloring map with grading.

The shadow processing part 38 generates a smoother gradation by performing grading on the generated coloring map as shown in FIG. 32. FIG. 32 is an image diagram showing the coloring map without grading and the coloring map with grading.

Proceeding to the coloring-map-based coloring of step S44, the shadow processing part 38 obtains a post-makeup image by coloring a pre makeup image based on the coloring map 903 generated in the coloring map generation of step S43 and on how to apply makeup and specified colors set in a makeup processing parameter file like FIG. 19.

Then, proceeding to the drawing for debugging and designing of step S45, the shadow processing part 38 performs drawing for debugging and designing, and thereafter ends the shadow processing. The shadow processing part 38 is capable of implementing a multi-color application by repeating the processing of steps S41 through S45 as many times as the number of coloring patterns.

[Cheek Processing]

Figure 33:
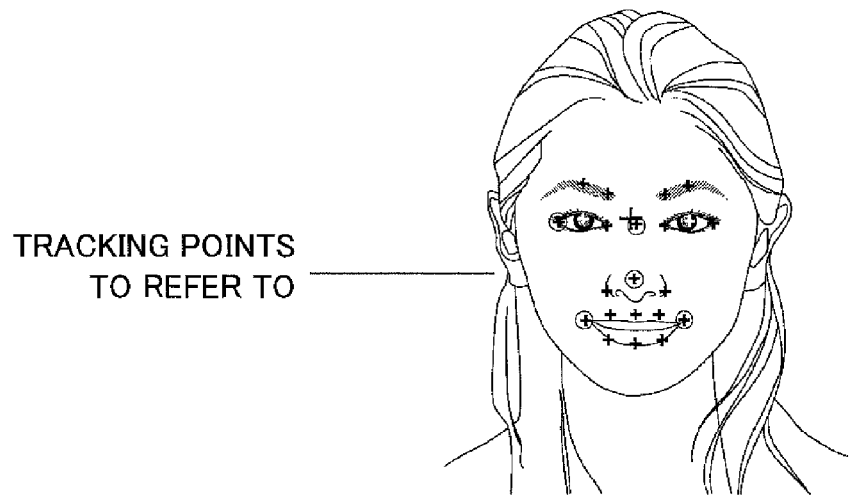
FIG. 33 is an image diagram showing the tracking points referred to by cheek processing.

The cheek processing part 40 included in the simulator main application 28 performs cheek processing, referring to the tracking points 34 on the outer eye corner and the mouth corner (of each of the right side and the left side) and between the eyes and at the center of the nose (for stabilization) as shown in FIG. 33. FIG. 33 is an image diagram showing the tracking points referred to by the cheek processing.

Figure 34:
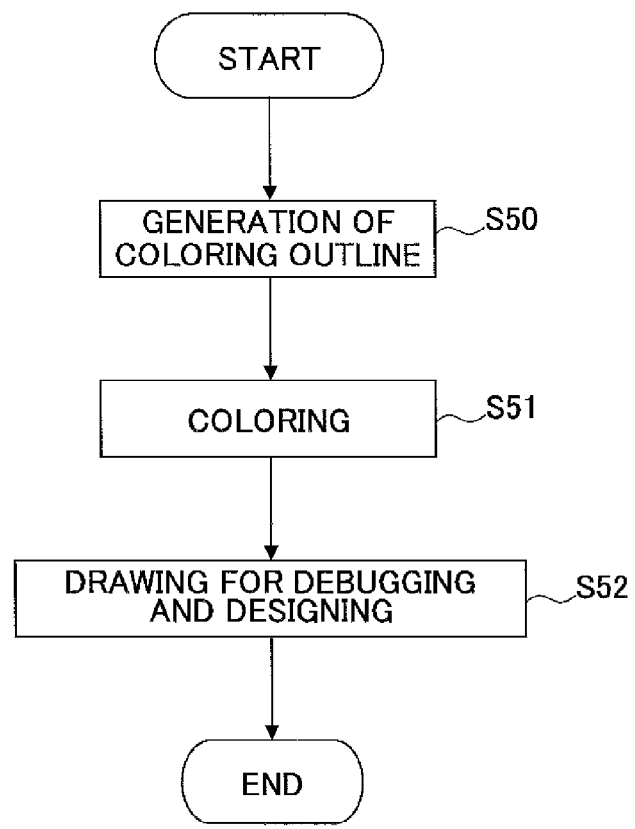
FIG. 34 is a flowchart showing the cheek processing.

FIG. 34 is a flowchart showing the cheek processing. The cheek processing includes the coloring outline generation of step S50, the coloring of step S51, and the drawing for debugging and designing of step S52.

Figure 35:
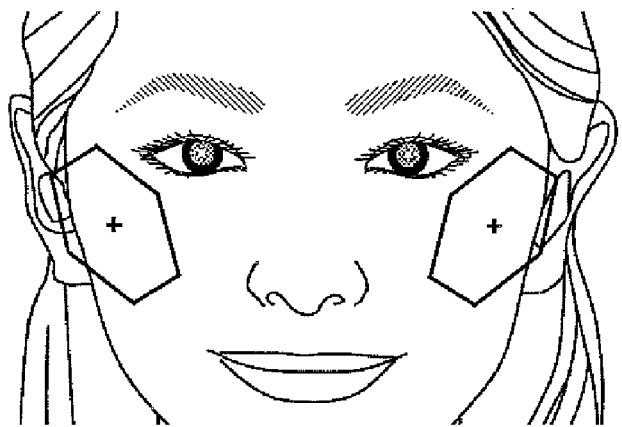
FIG. 35 is an image diagram showing a coloring outline.

Proceeding to the coloring outline generation of step S50, the cheek processing part 40 generates an outline polygon as a coloring outline based on the outer eye corner and the mouth corner in order to generate the coloring outline. FIG. 35 is an image diagram showing the coloring outline. The number of points, size, shape, or position of the outline polygon may be specified by parameters with a GUI.

Proceeding to the coloring of step S51, the cheek processing part 40 determines the strength of application in correspondence to the distances from the coloring center to the sides of the outline polygon. If the determination of application strength requires too much processing cost, the strength of application may be determined by reducing (thinning out in a mosaic-like manner) resolution (parameters specified with a GUI). The cheek processing part 40 obtains a post-makeup image by coloring a pre-makeup image based on the determined strength of application and on how to apply makeup and specified colors set in a makeup processing parameter file like FIG. 19.

Then, proceeding to the drawing for debugging and designing of step S52, the cheek processing part 40 performs drawing for debugging and designing, and thereafter ends the cheek processing.

[Eyebrow Processing]

Figure 36:
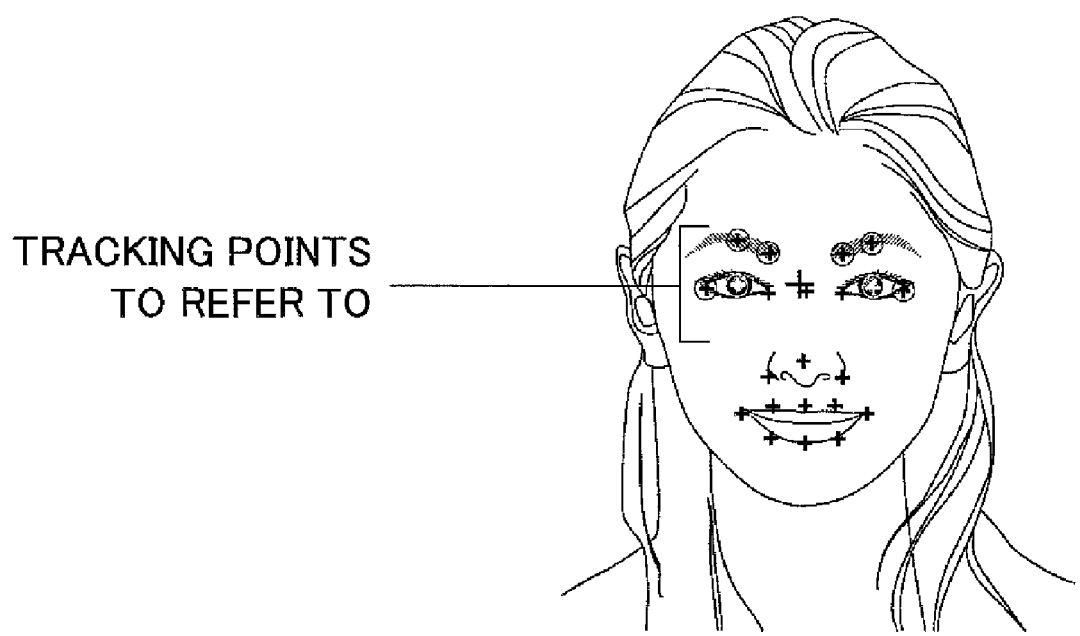
FIG. 36 is an image diagram showing the tracking points referred to by eyebrow processing.

The eyebrow processing part 37 included in the simulator main application 28 performs eyebrow processing, referring to the tracking points 34, one on the outer eye corner, one on the eye center, and two on the eyebrow, for each of the right side and the left side as shown in FIG. 36. FIG. 36 is an image diagram showing the tracking points referred to by the eyebrow processing.

Figure 37:
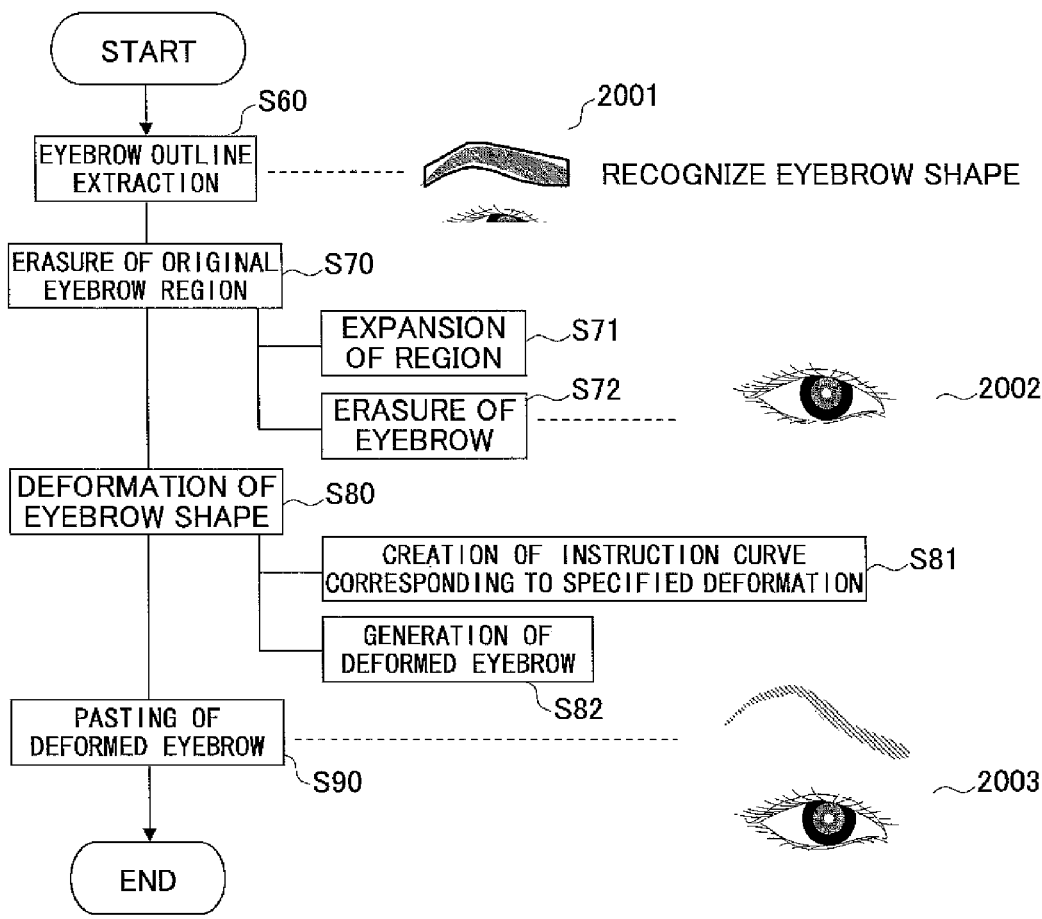
FIG. 37 is a flowchart showing the eyebrow processing.

FIG. 37 is a flowchart showing the eyebrow processing. Broadly speaking, the eyebrow processing includes the eyebrow outline extraction of step S60, the original eyebrow region erasure of step S70, the eyebrow shape deformation of step S80, and the deformed eyebrow pasting of step S90.

The original eyebrow region erasure includes the region expansion of step S71 and the eyebrow erasure of step S72. The eyebrow shape deformation includes the creation of an instruction curve corresponding to a specified deformation of step S81 and the deformed eyebrow generation of step S82.

Figure 38:
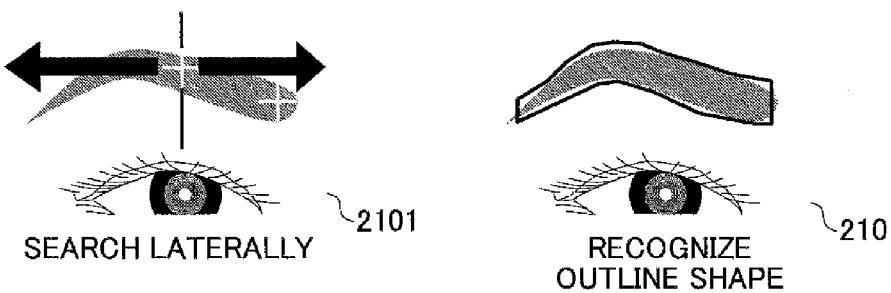
FIG. 38 is an image diagram showing eyebrow outline extraction.

Proceeding to the eyebrow outline extraction of step S60, the eyebrow processing part 37 obtains the shape of an eyebrow of the user's face like a partial image 2001 from the image for face recognition. FIG. 38 is an image diagram showing the eyebrow outline extraction. The eyebrow processing part 37 searches the eyebrow rightward and leftward from the outer eyebrow end (around the center of the eyebrow in practice) as shown in a partial image 2101 in order to extract the outline of the eyebrow. The eyebrow processing part 37 recognizes the outline shape of the eyebrow from the search result as shown in a partial image 2102.

Proceeding to the region expansion of step S71, the eyebrow processing part 37 expands a region showing the recognized outline shape of the eyebrow. Proceeding to the eyebrow erasure of step S72, the eyebrow processing part 37 erases the eyebrow by filling in the expanded region with a nearby skin color. Further, the eyebrow processing part 37 performs blending on the boundary part of the expanded region.

Figure 39:
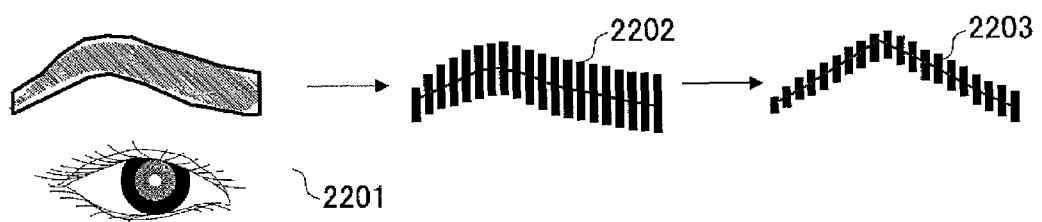
FIG. 39 is an image diagram showing creation of an instruction curve corresponding to a specified deformation.

Proceeding to the creation of an instruction curve corresponding to a specified deformation of step S81, the eyebrow processing part 37 deforms the region (skeleton) showing the recognized outline shape of the eyebrow as specified. FIG. 39 is an image diagram showing the creation of an instruction curve corresponding to a specified deformation.

By replacing the region showing the recognized outline shape of the eyebrow as shown in a partial image 2201 with a skeleton 2202 composed of a lateral axis and multiple vertical strips and changing the shape of the axis and the height of the strips, the eyebrow processing part 37 can deform the region showing the recognized outline shape of the eyebrow like, for example, a skeleton 2203.

Proceeding to the deformed eyebrow generation of step S82, the eyebrow processing part 37 generates a deformed eyebrow from the skeleton 2203. Proceeding to the deformed eyebrow pasting of step S90, the eyebrow processing part 37 obtains a post-makeup image by pasting the deformed eyebrow to a pre-makeup image.

[Foundation Processing]

Figure 40:
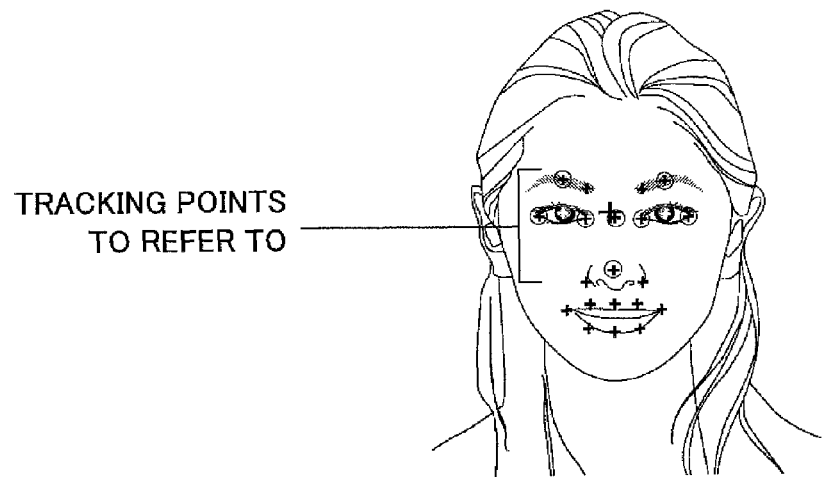
FIG. 40 is an image diagram showing the tracking points referred to by foundation processing.

The foundation processing part 36 included in the simulator main application 28 performs foundation processing, referring to the tracking points 34, one on each of the outer eye corner, the inner eye corner, and the eyebrow on each of the right side and the left side, and between the eyes and at the center of the nose, as shown in FIG. 40. FIG. 40 is an image diagram showing the tracking points referred to by the foundation processing.

Figure 41:
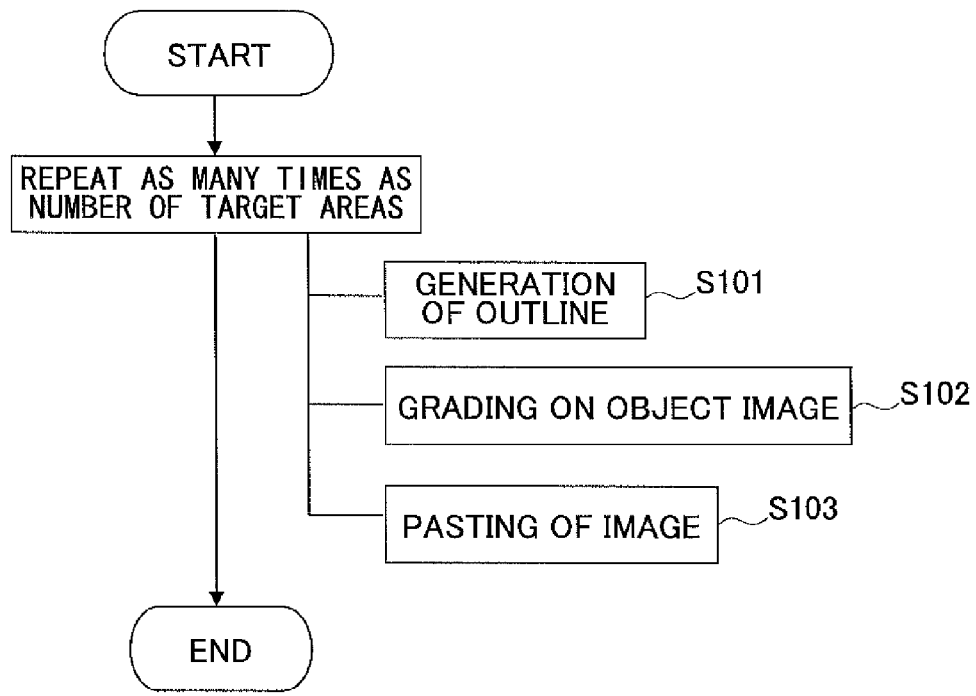
FIG. 41 is a flowchart showing the foundation processing.

FIG. 41 is a flowchart showing the foundation processing. The foundation processing includes the outline generation of step S101, the grading on an object image of step S102, and the image pasting of step S103. The processing of steps S101 through S103 is repeated as many times as the number of target regions.

Figure 42:
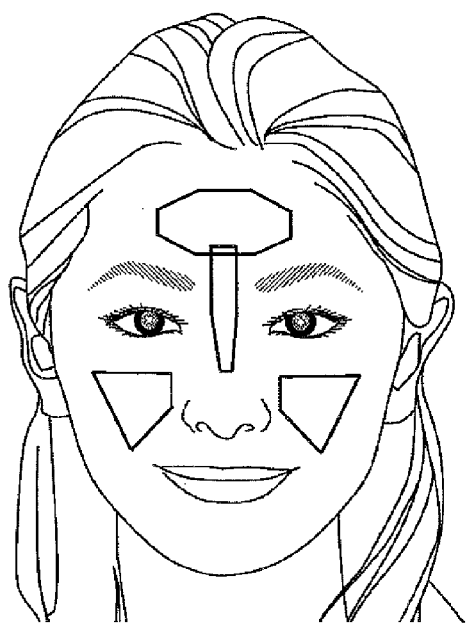
FIG. 42 is an imaginary image showing outlines.

Proceeding to the outline generation of step S101, the foundation processing part 36 generates the outlines of three kinds (four parts) of the forehead, nose, and cheeks (right and left) as shown in the imaginary image of FIG. 42. FIG. 42 is an imaginary image showing the outlines. The size and position of each outline may be specified by parameters with a GUI.

Figure 43:
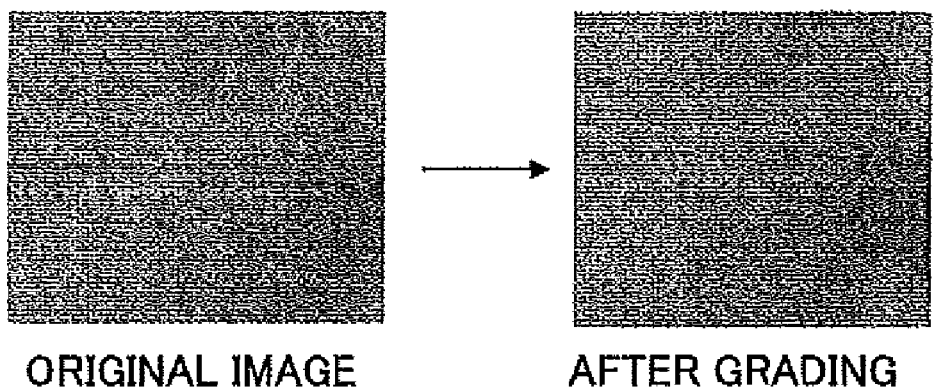
FIG. 43 is an image diagram showing an original image before grading and the original image after grading.

Proceeding to the grading on an object image of step S102, the foundation processing part 36 performs grading on object images corresponding to the generated outlines as FIG. 43. FIG. 43 is an image diagram showing an original image before grading and the original image after grading. By performing grading on an object image, the foundation processing part 36 can smooth minute skin roughness.

Proceeding to the image pasting of step S103, the foundation processing part 36 obtains a post-makeup image by pasting the object images after grading to the outlines of three types (four parts) of the forehead, nose, and cheeks (right and left) of a pre-makeup image.

Thus, according to the present invention, it is possible to accurately apply makeup to a user's face included in a video with a reduced processing load. Image capturing means described in CLAIMS corresponds to the camera 2, control means corresponds to the control part 8, display means corresponds to the monitor 7, face recognition means corresponds to the face recognition part 33, makeup processing means corresponds to the makeup processing part 35, operation means corresponds to the operations panel 4, half mirror means corresponds to the half mirror 3, and printing means corresponds to the printer 5.

Further, the present invention is not limited to the specifically disclosed embodiments, and variations and modifications may be made without departing from CLAIMS.

Unlike those based on still images or the conventional makeup simulator 1, the makeup simulator 1 of the present invention, which performs a real-time simulation, is capable of instantaneously recognizing tracking points of a face and performing simulation based on the tracking points. Therefore, the makeup simulator 1 enables the following that have not been possible so far.

The makeup simulator 1 of the present invention is capable of a real-time simulation. The makeup simulator 1 of the present invention is capable of simulation not only from a full face as conventionally but also from a face in profile. Accordingly, it is easy to view the simulation effect or technique of blusher or the like.

The makeup simulator 1 of the present invention is capable of not only the conventional two-dimensional representation but also analyzing a face as a three-dimensional shape and representing solidity and texture.

Further, since the makeup simulator 1 of the present invention is capable of recognizing multiple faces at the same time, the makeup simulator 1 of the present invention is capable of performing simulation for multiple persons at the same time. Since the makeup simulator 1 of the present invention has an excellent face recognition function, the makeup simulator 1 of the present invention is capable of automatically performing classification according to individual features or performing classification into men and women, and doing makeup suited to features or classification. For example, the makeup simulator 1 of the present invention is capable of simultaneously performing respective makeup simulations for a couple.

The present international application claims priority based on Japanese Patent Application No. 2006-9268, filed on Jan. 17, 2006, the entire contents of which are incorporated into the present international application.

The invention claimed is:

1. A makeup simulation system applying makeup to a video having an image of a face of a user captured thereon, comprising:
    a camera configured to capture the image of the face of the user and outputting the video;
    a processor configured to receive the video output from the camera, to perform image processing on the video, and to output the video; and
    a display part configured to display the video output from the processor,
    wherein the processor includes
        a face recognition part configured to recognize the face of the user from the video based on predetermined tracking points; and
        a makeup processing part configured to apply a predetermined makeup on the face of the user included in the video based on the tracking points and to output the video to the display means part.

2. The makeup simulation system as claimed in claim 1, wherein the makeup processing part comprises at least one of:
    a foundation processing part configured to perform foundation processing on the face of the user included in the video based on the tracking points;
    a lipstick processing part configured to perform lipstick processing on the face of the user included in the video based on the tracking points;
    an eyebrow processing part configured to perform eyebrow processing on the face of the user included in the video based on the tracking points;
    a cheek processing part configured to perform cheek processing on the face of the user included in the video based on the tracking points; and
    a shadow processing part configured to perform shadow processing on the face of the user included in the video based on the tracking points.

3. The makeup simulation system as claimed in claim 1, wherein the makeup processing part is configured to generate an outline for applying the predetermined makeup on the face of the user included in the video based on the tracking points, and to perform coloring based on the outline.

4. The makeup simulation system as claimed in claim 1, wherein the makeup processing part is configured to successively apply a plurality of types of makeup on the face of the user included in the video at predetermined times, and to output an imaginary image with the makeup to the display part.

5. The makeup simulation system as claimed in claim 4, further comprising:
    a storing part configured to store merchandise information for applying makeup like the imaginary image for each of the types of the makeup,
    wherein the makeup processing part is configured to obtain the merchandise information for applying makeup like the imaginary image from the storing part, and to output the merchandise information to the display part.

6. The makeup simulation system as claimed in claim 1, wherein the makeup processing part is configured to output a comparison screen including imaginary images of the face of the user included in the video before and after the makeup to the display part.

7. The makeup simulation system as claimed in claim 1, further comprising:
    a reading part configured to read identification information of an article selected by the user; and
    a correlation part configured to correlate the article and the identification information,
    wherein the makeup processing part is configured to identify the article corresponding to the identification information read from the reading part based on the correlation part, and to output to the display part an imaginary image of the face of the user included in the video on which face the predetermined makeup has been applied using the article.

8. A makeup simulator applying makeup to a video having an image of a face of a user captured thereon, comprising:
    image capturing means for capturing the image of the face of the user and outputting the video;
    control means for receiving the video output from the image capturing means, performing image processing on the video, and outputting the video; and display means for displaying the video output from the control means,
wherein the control means includes
face recognition means for recognizing the face of the user from the video based on predetermined tracking points; and
makeup processing means for applying a predetermined makeup on the face of the user included in the video based on the tracking points and outputting the video to the display means.

9. The makeup simulator as claimed in claim 8, further comprising:
half mirror means provided on a side of a display direction of the display means,
wherein the half mirror means transmits light from a side of the display means to a side of the user with the video being displayed on the display means, and reflects light from the side of the user with the video not being displayed on the display means.

10. The makeup simulator as claimed in claim 8, further comprising:
half mirror means provided on a side of a display direction of the display means,
wherein the image capturing means is provided at a position so as to be able to capture the image of the face of the user in response to a transmission thereof through the half mirror means, and
the half mirror means transmits light from a side of the display means to a side of the user and transmits light from the side of the user to a side of the image capturing means.

11. The makeup simulator as claimed in claim 8, further comprising:
printing means for printing an imaginary image of the face of the user with the makeup displayed on the display means.

12. The makeup simulator as claimed in claim 8, further comprising:
exhibition means for exhibiting a commercial product for applying makeup like an imaginary image of the face of the user with the makeup displayed on the display means.

13. The makeup simulator as claimed in claim 8, further comprising:
reading means for reading identification information of an article selected by the user; and
correlation means for correlating the article and the identification information,
wherein the makeup processing means identifies the article corresponding to the identification information read from the reading means based on the correlation means, and outputs to the display means an imaginary image of the face of the user included in the video on which face the predetermined makeup has been applied using the article.

14. A makeup simulation method in a makeup simulation system applying makeup to a video having an image of a face of a user captured thereon, comprising the steps of:
control means recognizing the face of the user from the video captured by image capturing means, and starting a makeup simulation;
the control means recognizing the face of the user included in the video based on predetermined tracking points; and
the control means applying a predetermined makeup to the face of the user included in the video based on the tracking points, and outputting the video to display means.

15. A non-transitory computer-readable recording medium storing a makeup simulation program for applying makeup to a video having an image of a face of a user captured thereon, the program being executed in a computer including at least a processor, a storage unit, and an output unit, wherein the processor executes the steps of:
recognizing the face of the user from the video captured by image capturing means, and starting a makeup simulation;
recognizing the face of the user included in the video based on predetermined tracking points; and
applying a predetermined makeup to the face of the user included in the video based on the tracking points, and outputting the video to display means.

* * * * *